United States Patent
Bankaitis et al.

(10) Patent No.: US 10,173,916 B2
(45) Date of Patent: Jan. 8, 2019

(54) EDGE CHAMFERING BY MECHANICALLY PROCESSING LASER CUT GLASS

(71) Applicant: Corning Incorporated, Corning, NY (US)

(72) Inventors: Jonas Bankaitis, Horseheads, NY (US); Kevin William Uhlig, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/114,243

(22) PCT Filed: Jan. 27, 2015

(86) PCT No.: PCT/US2015/013026
§ 371 (c)(1),
(2) Date: Jul. 26, 2016

(87) PCT Pub. No.: WO2015/113026
PCT Pub. Date: Jul. 30, 2015

(65) Prior Publication Data
US 2017/0008793 A1   Jan. 12, 2017

Related U.S. Application Data

(63) Continuation of application No. 14/530,410, filed on Oct. 31, 2014.
(Continued)

(51) Int. Cl.
C03B 33/02 (2006.01)
B24B 9/10 (2006.01)
(Continued)

(52) U.S. Cl.
CPC .......... *C03B 33/0222* (2013.01); *B23K 26/02* (2013.01); *B23K 26/04* (2013.01);
(Continued)

(58) Field of Classification Search
CPC ...... B23K 26/00; B23K 26/02; B23K 26/037; B23K 26/04; B23K 26/057; B23K 26/06;
(Continued)

(56) References Cited

U.S. PATENT DOCUMENTS 1,790,397 A    1/1931  Woods et al.
2,032,540 A *  3/1936  La Hodny ............ H01H 23/025
                                                        126/190
(Continued)

FOREIGN PATENT DOCUMENTS

CN    2388062 Y    7/2000
CN    1283409 C    11/2006
(Continued)

OTHER PUBLICATIONS

PCT/US2015/013026 Search Report; International Searching Authority; dated Aug. 10, 2015; pp. 1-19; EPO.
(Continued)

*Primary Examiner* — Timothy V Eley
(74) *Attorney, Agent, or Firm* — Smit Kapadia; Svetlana Z. Short

(57) ABSTRACT

Processes of chamfering and/or beveling an edge of a glass substrate of arbitrary shape using lasers are described herein. Two general methods to produce chamfers on glass substrates are the first method involves cutting the edge with the desired chamfer shape utilizing an ultra-short pulse laser that is followed by mechanical polishing with a compliant polishing wheel.

17 Claims, 34 Drawing Sheets

1) Defect line on chamfer side B

2) Defect line on flat edge 3) defect line on chamfer side A

Related U.S. Application Data

(60) Provisional application No. 62/022,885, filed on Jul. 10, 2014, provisional application No. 61/932,030, filed on Jan. 27, 2014.

(51) Int. Cl.

| | | |
|---|---|---|
| *B23K 26/08* | (2014.01) | |
| *C03B 33/09* | (2006.01) | |
| *C03B 33/08* | (2006.01) | |
| *B23K 26/53* | (2014.01) | |
| *B23K 26/02* | (2014.01) | |
| *B23K 26/04* | (2014.01) | |
| *B23K 26/0622* | (2014.01) | |
| *B23K 26/362* | (2014.01) | |
| *B23K 26/402* | (2014.01) | |
| *C03C 21/00* | (2006.01) | |
| *B23K 103/00* | (2006.01) | |

(52) U.S. Cl.
CPC ........ *B23K 26/0624* (2015.10); *B23K 26/083* (2013.01); *B23K 26/0869* (2013.01); *B23K 26/362* (2013.01); *B23K 26/402* (2013.01); *B23K 26/53* (2015.10); *B24B 9/10* (2013.01); *C03B 33/082* (2013.01); *C03B 33/091* (2013.01); *C03C 21/002* (2013.01); *B23K 2103/50* (2018.08); *B23K 2103/54* (2018.08); *Y02P 40/57* (2015.11); *Y10T 428/15* (2015.01); *Y10T 428/24777* (2015.01)

(58) Field of Classification Search
CPC .............. B23K 26/0624; B23K 26/083; B23K 26/0869; B23K 26/36; B23K 26/361; B23K 26/362; B23K 26/402; B23K 2203/50; B23K 2203/54; B24B 9/10; B24B 9/102; B24B 9/105; B24B 9/107; B24D 9/02; C03B 25/087; C03B 29/10; C03B 33/02; C03B 33/0222; C03B 33/082; C03B 33/09; C03B 33/091; C03C 21/002; Y10T 428/15; Y10T 428/24777
See application file for complete search history.

(56) References Cited

U.S. PATENT DOCUMENTS

| | | | |
|---|---|---|---|
| 2,047,561 A * | 7/1936 | Jelley | G01N 21/4133 356/134 |
| 2,682,134 A | 6/1954 | Stookey | |
| 2,749,794 A | 6/1956 | O'Leary | |
| 3,647,410 A | 3/1972 | Heaton et al. | |
| 3,695,497 A | 10/1972 | Dear | |
| 3,695,498 A | 10/1972 | Dear | |
| 3,729,302 A | 4/1973 | Heaton | |
| 3,775,084 A | 11/1973 | Heaton | |
| 4,145,829 A * | 3/1979 | Peltier | B42F 5/04 40/771 |
| 4,226,607 A | 10/1980 | Domken | |
| 4,441,008 A | 4/1984 | Chan | |
| 4,546,231 A | 10/1985 | Gresser et al. | |
| 4,646,308 A | 2/1987 | Kafka et al. | |
| 4,764,930 A | 8/1988 | Bille et al. | |
| 4,891,054 A | 1/1990 | Bricker et al. | |
| 4,907,586 A | 3/1990 | Bille et al. | |
| 4,918,751 A | 4/1990 | Pessot et al. | |
| 4,929,065 A | 5/1990 | Hagerty et al. | |
| 5,035,918 A | 7/1991 | Vyas | |
| 5,040,182 A | 8/1991 | Spinelli et al. | |
| 5,104,210 A | 4/1992 | Tokas | |
| 5,108,857 A | 4/1992 | Kitayama et al. | |
| 5,112,722 A | 5/1992 | Tsujino et al. | |
| 5,114,834 A | 5/1992 | Nachshon | |
| 5,265,107 A | 11/1993 | Delfyett, Jr. | |
| 5,400,350 A | 3/1995 | Galvanauskas | |
| 5,434,875 A | 7/1995 | Rieger et al. | |
| 5,436,925 A | 7/1995 | Lin et al. | |
| 5,553,093 A | 9/1996 | Ramaswamy et al. | |
| 5,574,597 A | 11/1996 | Kataoka et al. | |
| 5,586,138 A | 12/1996 | Yokoyama | |
| 5,609,284 A * | 3/1997 | Kondratenko | B23K 26/0736 219/121.67 |
| 5,622,540 A * | 4/1997 | Stevens | B23K 26/0736 219/121.6 |
| 5,656,186 A | 8/1997 | Mourou et al. | |
| 5,676,866 A | 10/1997 | In Den Baumen et al. | |
| 5,684,642 A | 11/1997 | Zumoto et al. | |
| 5,696,782 A | 12/1997 | Harter et al. | |
| 5,736,709 A | 4/1998 | Neiheisel | |
| 5,776,220 A | 7/1998 | Allaire et al. | |
| 5,975,992 A * | 11/1999 | Raeder | B24B 1/00 451/41 |
| 6,016,223 A | 1/2000 | Suzuki et al. | |
| 6,016,324 A | 1/2000 | Rieger et al. | |
| 6,033,583 A | 3/2000 | Musket et al. | |
| 6,038,055 A | 3/2000 | Hansch et al. | |
| 6,055,829 A | 5/2000 | Witzmann et al. | |
| 6,078,599 A | 6/2000 | Everage et al. | |
| 6,156,030 A | 12/2000 | Neev | |
| 6,160,835 A | 12/2000 | Kwon | |
| 6,181,408 B1 * | 1/2001 | von Gutfeld | G02F 1/1341 141/5 |
| 6,186,384 B1 | 2/2001 | Sawada | |
| 6,210,401 B1 | 4/2001 | Lai | |
| 6,256,328 B1 | 7/2001 | Delfyett et al. | |
| 6,259,151 B1 | 7/2001 | Morrison | |
| 6,259,512 B1 | 7/2001 | Mizouchi | |
| 6,272,156 B1 | 8/2001 | Reed et al. | |
| 6,301,932 B1 | 10/2001 | Allen et al. | |
| 6,322,958 B1 | 11/2001 | Hayashi | |
| 6,339,208 B1 | 1/2002 | Rockstroh et al. | |
| 6,373,565 B1 | 4/2002 | Kafka et al. | |
| 6,381,391 B1 | 4/2002 | Islam et al. | |
| 6,396,856 B1 | 5/2002 | Sucha et al. | |
| 6,407,360 B1 | 6/2002 | Choo et al. | |
| 6,438,996 B1 | 8/2002 | Cuvelier | |
| 6,445,491 B2 | 9/2002 | Sucha et al. | |
| 6,449,301 B1 | 9/2002 | Wu et al. | |
| 6,484,052 B1 | 11/2002 | Visuri et al. | |
| 6,489,589 B1 | 12/2002 | Alexander | |
| 6,501,578 B1 | 12/2002 | Bernstein et al. | |
| 6,552,301 B2 | 4/2003 | Herman et al. | |
| 6,573,026 B1 | 6/2003 | Aitken et al. | |
| 6,592,703 B1 | 7/2003 | Habeck et al. | |
| 6,635,849 B1 | 10/2003 | Okawa et al. | |
| 6,635,850 B2 | 10/2003 | Amako et al. | |
| 6,685,541 B2 * | 2/2004 | Brown | B24B 9/102 451/41 |
| 6,720,519 B2 | 4/2004 | Liu et al. | |
| 6,729,161 B1 | 5/2004 | Miura et al. | |
| 6,744,009 B1 | 6/2004 | Xuan et al. | |
| 6,787,732 B1 | 9/2004 | Xuan et al. | |
| 6,800,237 B1 | 10/2004 | Yamamoto et al. | |
| 6,800,831 B1 | 10/2004 | Hoetzel | |
| 6,958,094 B2 | 10/2005 | Ohmi et al. | |
| 6,992,026 B2 | 1/2006 | Fukuyo et al. | |
| 7,009,138 B2 | 3/2006 | Amako et al. | |
| 7,353,829 B1 | 4/2008 | Wachter et al. | |
| 7,402,773 B2 | 7/2008 | Nomaru | |
| 7,511,886 B2 | 3/2009 | Schultz et al. | |
| 7,535,634 B1 | 5/2009 | Savchenkov et al. | |
| 7,633,033 B2 | 12/2009 | Thomas et al. | |
| 7,642,483 B2 | 1/2010 | You et al. | |
| 7,649,153 B2 | 1/2010 | Haight et al. | |
| 7,726,532 B2 | 6/2010 | Gonoe | |
| 8,104,385 B2 | 1/2012 | Hayashi et al. | |
| 8,118,971 B2 | 2/2012 | Hori et al. | |
| 8,132,427 B2 | 3/2012 | Brown et al. | |
| 8,168,514 B2 | 5/2012 | Garner et al. | |
| 8,245,539 B2 | 8/2012 | Lu et al. | |
| 8,245,540 B2 | 8/2012 | Abramov et al. | |
| 8,269,138 B2 | 9/2012 | Garner et al. | |
| 8,283,595 B2 | 10/2012 | Fukuyo et al. | |

(56) References Cited

U.S. PATENT DOCUMENTS

| | | |
|---|---|---|
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Gamer et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,721,392 B2 * | 5/2014 | Brown .................. B24B 9/102 451/43 |
| 8,814,633 B2 * | 8/2014 | Brown .................. B24B 9/10 451/11 |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss |
| 8,943,855 B2 | 2/2015 | Gomez et al. |
| 8,971,053 B2 | 3/2015 | Kariya et al. |
| 8,974,268 B2 * | 3/2015 | Darcangelo ............ B24B 1/005 451/36 |
| 9,028,296 B2 * | 5/2015 | Venkatachalam ......... B24B 1/00 451/44 |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0007773 A1 | 1/2003 | Kondo et al. |
| 2004/0221615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0028728 A1 | 2/2006 | Li |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0227440 A1 | 10/2006 | Gluckstad |
| 2006/0266744 A1 | 11/2006 | Nomura |
| 2006/0289410 A1 | 12/2006 | Morita et al. |
| 2007/0091977 A1 | 4/2007 | Sohn et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0079940 A1 | 4/2008 | Sezerman et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0326138 A1 | 12/2010 | Kumatani et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1 | 6/2011 | Shah et al. |
| 2011/0183116 A1 | 7/2011 | Hung et al. |
| 2011/0210105 A1 | 9/2011 | Romashko et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |

(56) References Cited

U.S. PATENT DOCUMENTS

| | | |
|---|---|---|
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarepu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0170388 A1* | 6/2014 | Kashima ............... C03C 15/00 428/157 |
| 2014/0174131 A1 | 6/2014 | Saito et al. |
| 2014/0199519 A1 | 7/2014 | Schillinger et al. |
| 2014/0216108 A1 | 8/2014 | Weigel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0335764 A1* | 11/2014 | Brown ................... B24B 9/10 451/44 |
| 2014/0361463 A1 | 12/2014 | DeSimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0279895 A1 | 9/2016 | Marjanovic et al. |
| 2016/0280580 A1 | 9/2016 | Bohme |
| 2016/0290791 A1 | 10/2016 | Buono et al. |
| 2017/0002601 A1* | 1/2017 | Bergh .................... B23K 26/38 |
| 2017/0169847 A1* | 6/2017 | Tamaki ................ G11B 5/7315 |

FOREIGN PATENT DOCUMENTS

| | | |
|---|---|---|
| CN | 101502914 A | 8/2009 |
| CN | 201357287 Y | 12/2009 |
| CN | 101637849 A | 2/2010 |
| CN | 201471092 U | 5/2010 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 A1 | 1/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 B1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 A | 11/1994 |
| JP | 9106243 A | 4/1997 |
| JP | 11197498 A | 7/1999 |
| JP | 11269683 A | 10/1999 |
| JP | 11330597 A | 11/1999 |
| JP | 11347758 A | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2009172633 A | 8/2009 |
| JP | 2010017990 A | 1/2010 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |

(56) References Cited

FOREIGN PATENT DOCUMENTS

| | | |
|---|---|---|
| JP | 2013031879 A | 2/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 B1 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201139025 A | 11/2011 |
| TW | 201226345 | 7/2012 |
| WO | 1999029243 A1 | 7/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008049389 A1 | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 20160154284 A1 | 9/2016 |

OTHER PUBLICATIONS

Abramov et al., "Laser separation of chemically strengthened glass"; Physics Procedia 5 (2010) 285-290, Elsevier.; doi: 10.1016/j.phpro.2010.08.054.
Arimoto et al., "Imaging properties of axicon in a scanning optical system"; Applied Optics, Nov. 1, 1992, vol. 31, No. 31, pp. 6653-6657.
"TruMicro 5000" Product Manual, Trumpf Laser GmbH + Co. KG, pp. 1-4, Aug. 2011.
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp-243-245, Feb. 15, 2002, Optical Society of America.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Krüger et al., "Femtosecond-pulse visible laser processing of transparent materials"; Applied Surface Science 96-98 (1996) 430-438.
Krüger et al., "Laser micromachining of barium aluminium borosilicate glass with pluse durations between 20 fs and 3 ps"; Applied Surface Science 127-129 (1998) 892-898.
Krüger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"PHAROS High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).

(56) References Cited

OTHER PUBLICATIONS

Yoshino et al., "Micromachining with a high repetition rate femtosecond fiber laser"; JLMN-Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1 -094302-10.
Zhang et al., "Design of diffractive-phase axicon illuminated by a Gaussian-profile beam"; Acta Physica Sinica (ooverseas edition), vol. 5, No. 5 (May 1996) Chin. Phys. Soc., 1004-423X/96/05050354-11, pp. 354-364.
Abakians, H. et al.; Evaporative Cutting of a Semitransparent Body With a Moving CW Laser; Journal of Heat Transfer; Nov. 1988; pp. 924-930; vol. 110; ASME.
Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning Eagle AMLCD Glass Substrates Material Information; Apr. 2005; pp. MIE 201-1—MIE 201-3; Corning Incorporated.
Corning 1737 AMLCD Glass Substrates Material Information; Aug. 2002; pp. MIE 101-1—MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 551-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.

Gori, F. et al.; Analytical derivation of the optimum triplicator; Optics Communications; Dec. 1, 1998; pp. 13-16; vol. 157; Elsevier B.V.
Honda, M. et al.; A Novel Polymer Film that Controls Light Transmission; Progress in Pacific Polymer Science 3; 1994; pp. 159-169; Springer-Verlag Berlin Heidelberg.
Hu, Z. et al.; 5-Axis Laser Culling Interference Detection and Correction Based on STL Model; Chinese Journal of Lasers; Dec. 2009; pp. 3313-3317; vol. 36, No. 12.
Huang, Z. et al.; Laser etching of glass substrates by 1064 nm laser irradiation; Applied Physics A Materials Science & Processing; Jun. 6, 2008; pp. 159-163; vol. 93; Springer-Verlag.
Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.
Karlsson, S. et al.; The Technology of Chemical Glass Strengthening—A Review; Glass Technology—European Journal of Glass Science and Technology Part A; Apr. 2010; pp. 41-54; vol. 51, No. 2.
Levy, U. et al.; Design, fabrication, and characterization of circular Dammann gratings based on grayscale lithography; Optics Letters; Mar. 15, 2010; pp. 880-882; vol. 35, No. 6; Optical Society of America.
Liu, X. et al.; Laser Ablation and Micromachining with Ultrashort Laser Pulses; IEEE Journal of Quantum Electronics; Oct. 1997; p. 1706-1716; vol. 33, No. 10; IEEE.
Maeda, K et al.; Optical performance of angle dependent light control glass; Optical Materials Technology for Energy Efficiency and Solar Energy Conversion X; 1991; pp. 138-148; vol. 1536; SPIE.
Mbise, G. et al.; Angular selective window coatings; theory and experiments; J. Phys. D: Appl. Phys.; 1997; pp. 2103-2122; vol. 30; IOP Publishing Ltd.
McGloin, D. et al.; Bessel beams: diffraction in a new light; Contemporary Physics; Jan.-Feb. 2005; pp. 15-28; vol. 46; Taylor & Francis Ltd.
Merola, F. et al.; Characterization of Bessel beams generated by polymeric microaxicons; Measurement Science and Technology; May 15, 2012; pp. 1-10; vol. 23; IOP Publishing Ltd.
Mirkhalaf, M. et al.; Overcoming the brittleness of glass through bio-inspiration and micro-architecture; Nature communications; Jan. 28, 2014; pp. 1-9; Macmillan Publishers Limited.
Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.
Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.
Serafetinides, A. et al.; Polymer Ablation by Ultra-Short Pulsed Lasers; Proceedings of SPIE; 2000; pp. 409-415.
Shah, L. et al.; Micromachining with a High Repetition Rate Femtosecond Fiber Laser; JLMN-Journal of Laser Micro/Nanoengineering; Nov. 2008; pp. 157-162; vol. 3, No. 3.
Shealy, D. et al.; Geometric optics-based design of laser beam shapers; Opt. Eng.; Nov. 2003; pp. 3123-3138; vol. 42, No. 11; Society of Photo-Optical Instrumentation Engineers.
Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.
Thiele, E.; Relation between Catalytic Activity and Size of Particle; Industrial and Engineering Chemistry; Jul. 1939; pp. 916-920; vol. 31, No. 7.
Toytman, I. et al.; Optical breakdown in transparent media with adjustable axial length and location; Optic Express; Nov. 22, 2010; pp. 24688-24698; vol. 18, No. 24; Optical Society of America.
Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 396711-1896711-8; vol. 8967; SPIE.

(56) References Cited

OTHER PUBLICATIONS

Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.

Ra & RMS: Calculating Surface Roughness; Harrison Eelectropolishing; 2012.

Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.

GT ASF Grown Sapphire Cover and Touch Screen Material; www.gtat.com; 2012; pp. 1-2; GTAT Corporation.

Xu, H. et al.; Optimization of 3D laser cutting head orientation based on minimum energy consumption; Int J Adv Manuf Technol; Jun. 28 2014; pp. 1283-1291; vol. 74; Springer-Verlag London.

Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.

Kerr. "Filamentary tracks formed in transparent optical glass by laser beam self-focusing. II. Theoretical Analysis" Physical Review A. 4(3) 1971, pp. 1196-1218.

\* cited by examiner

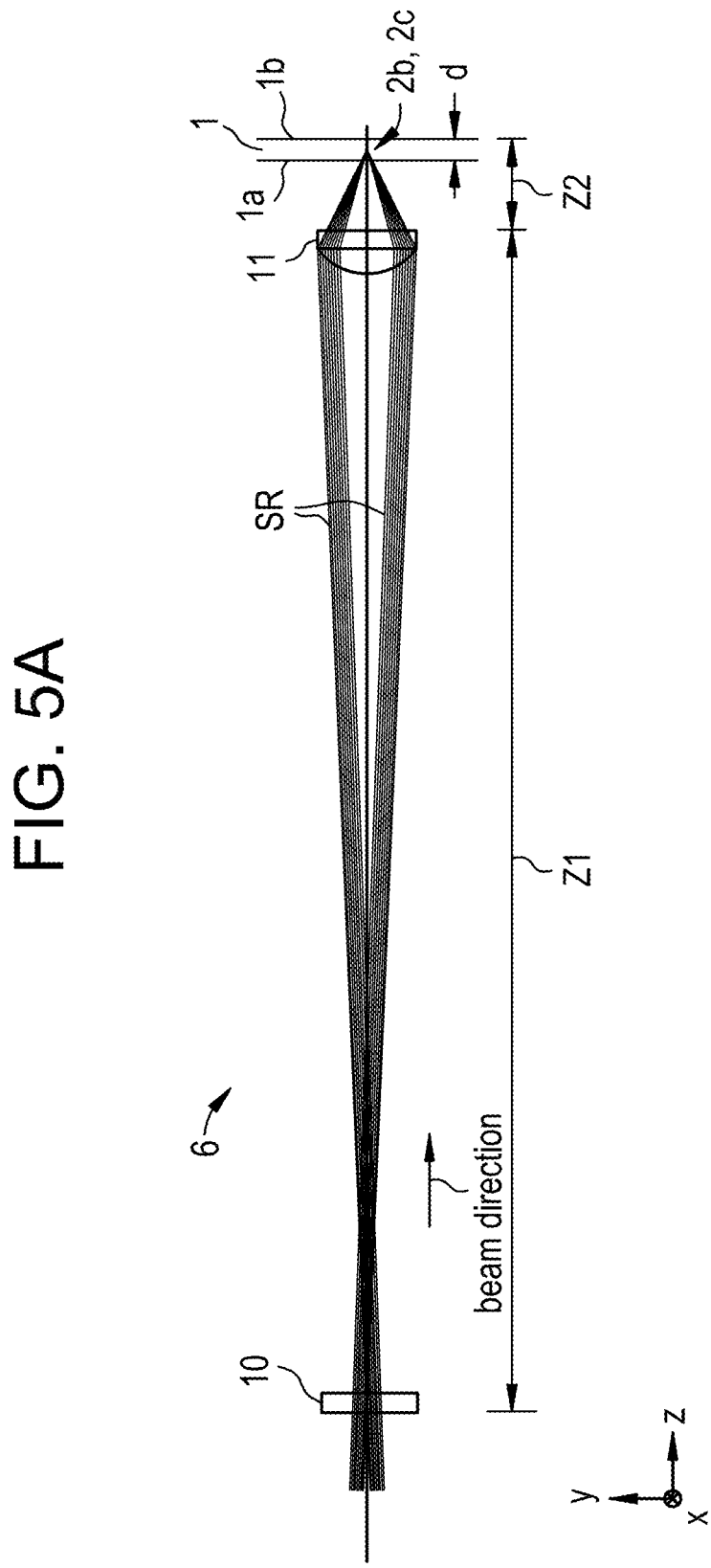

FIG. 7B
1) Defect line on chamfer side B
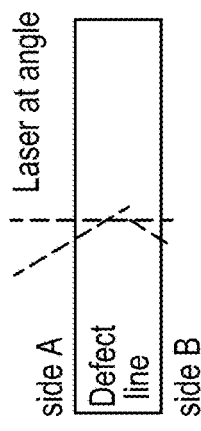
2) Defect line on flat edge
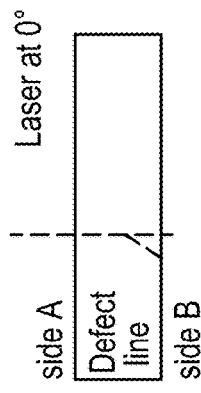
3) defect line on chamfer side A
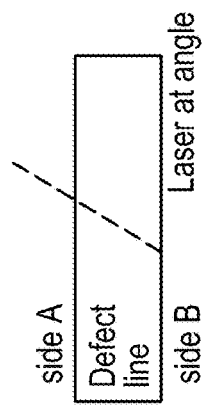
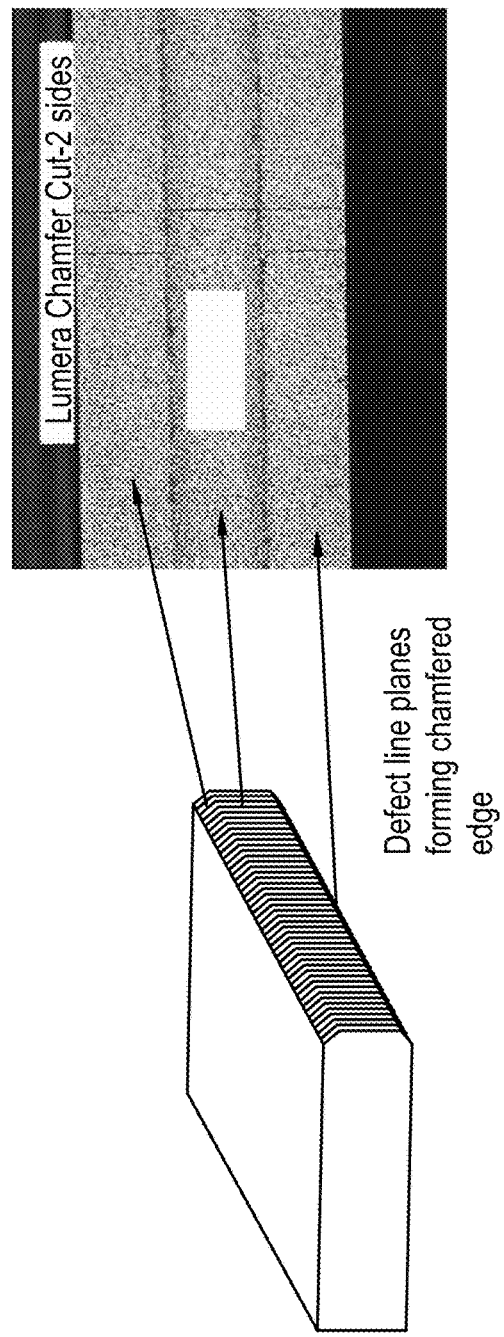

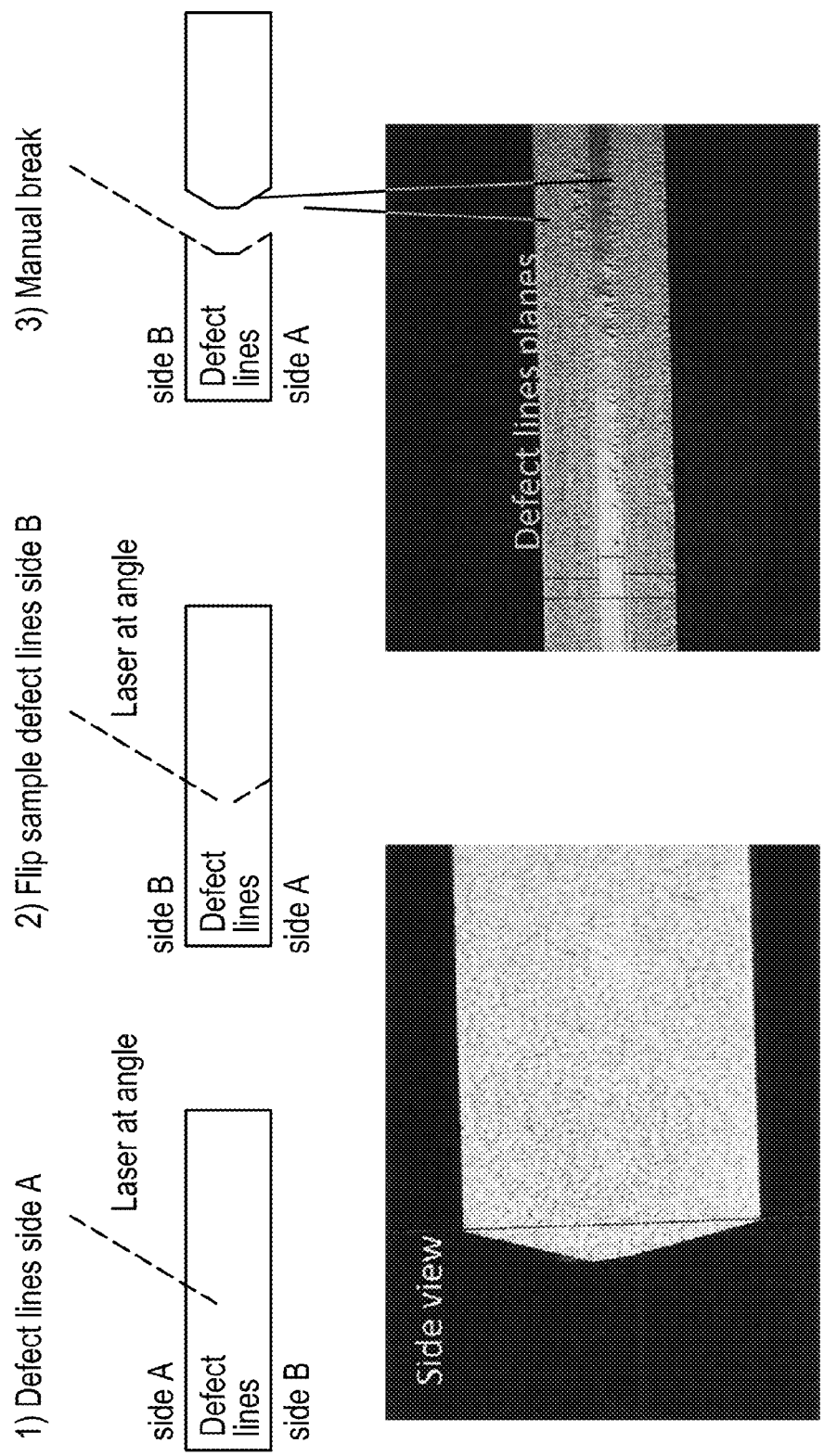

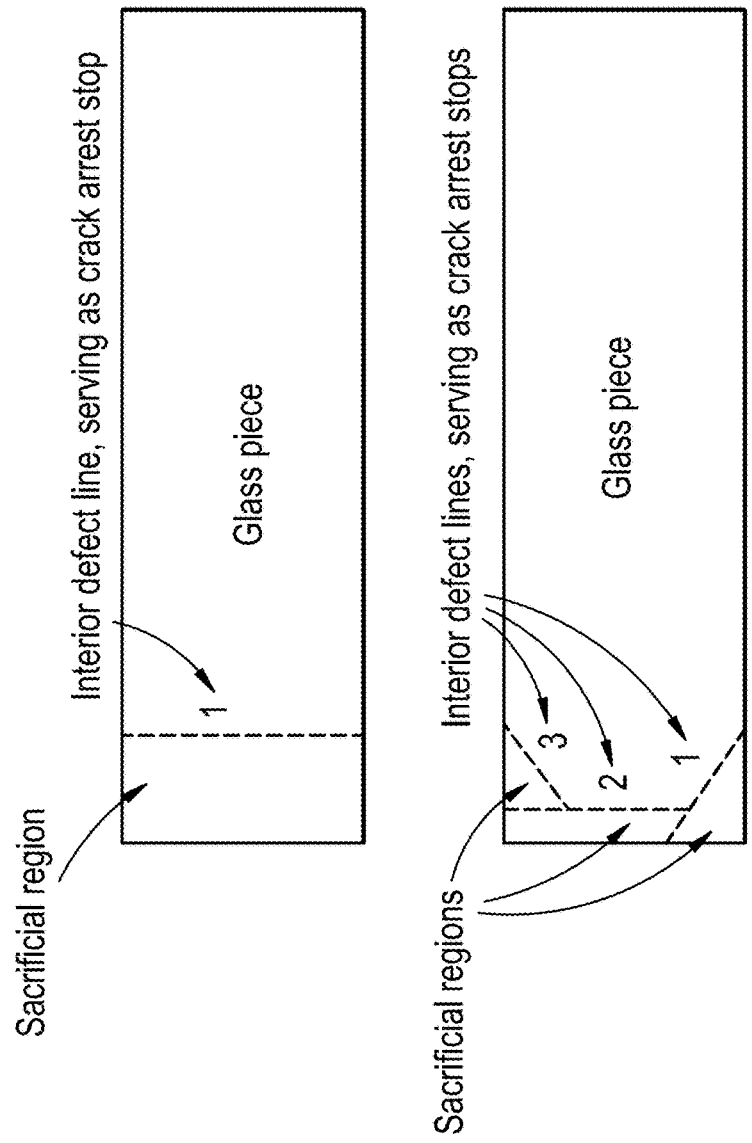

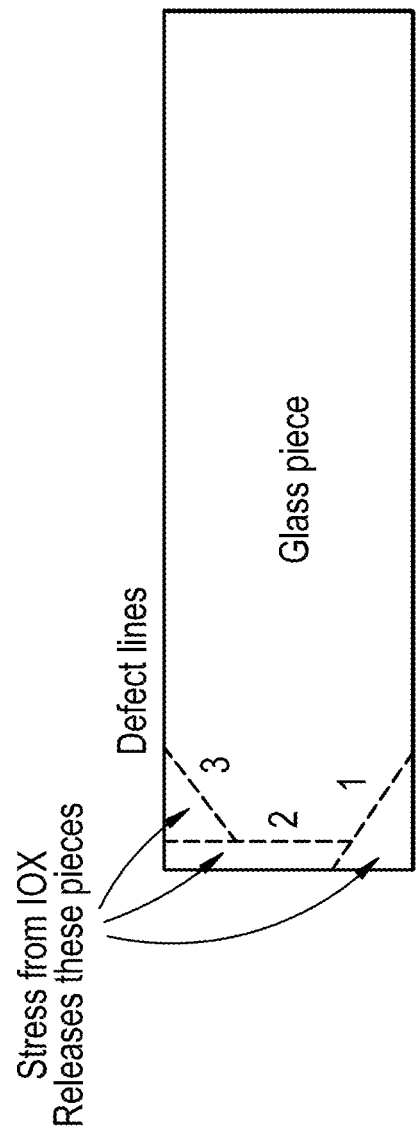

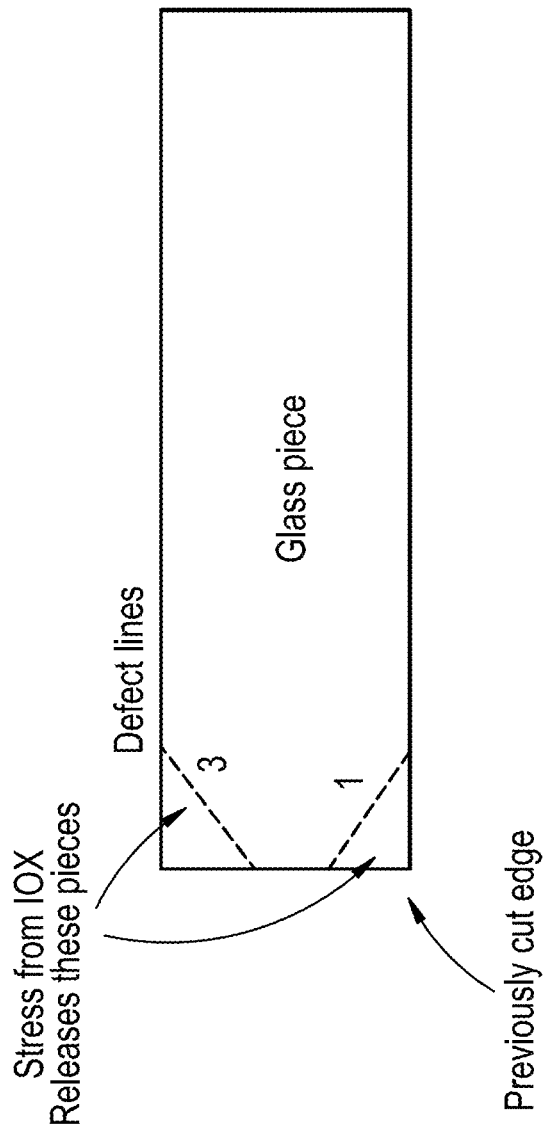

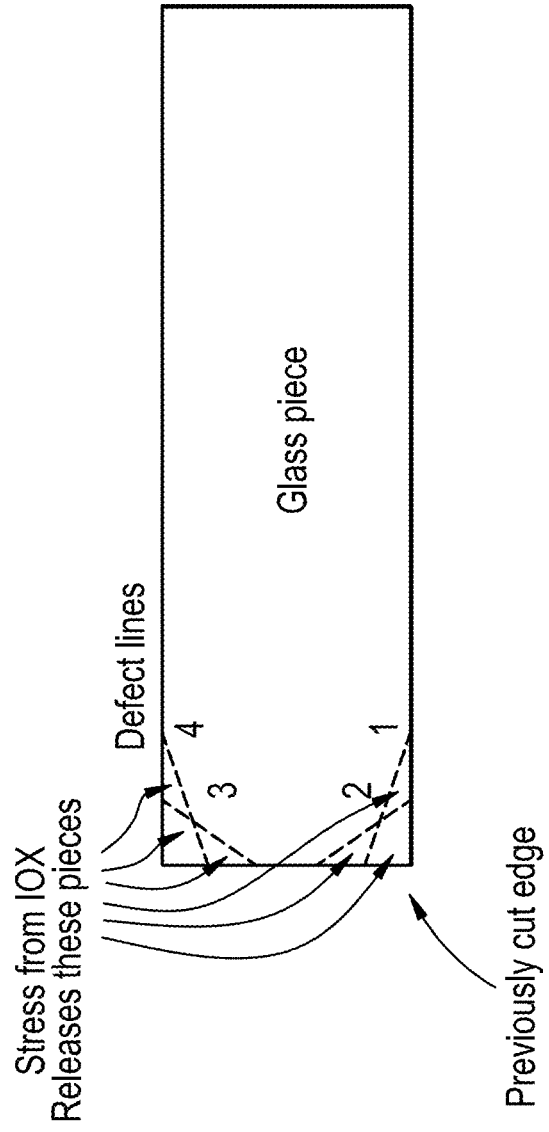

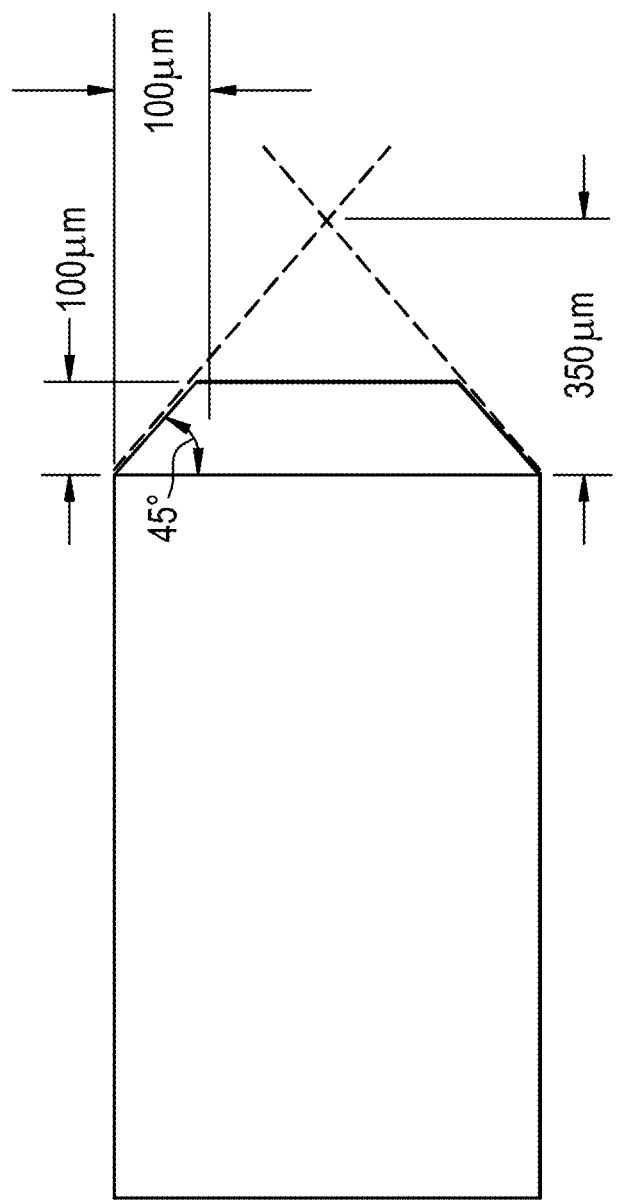

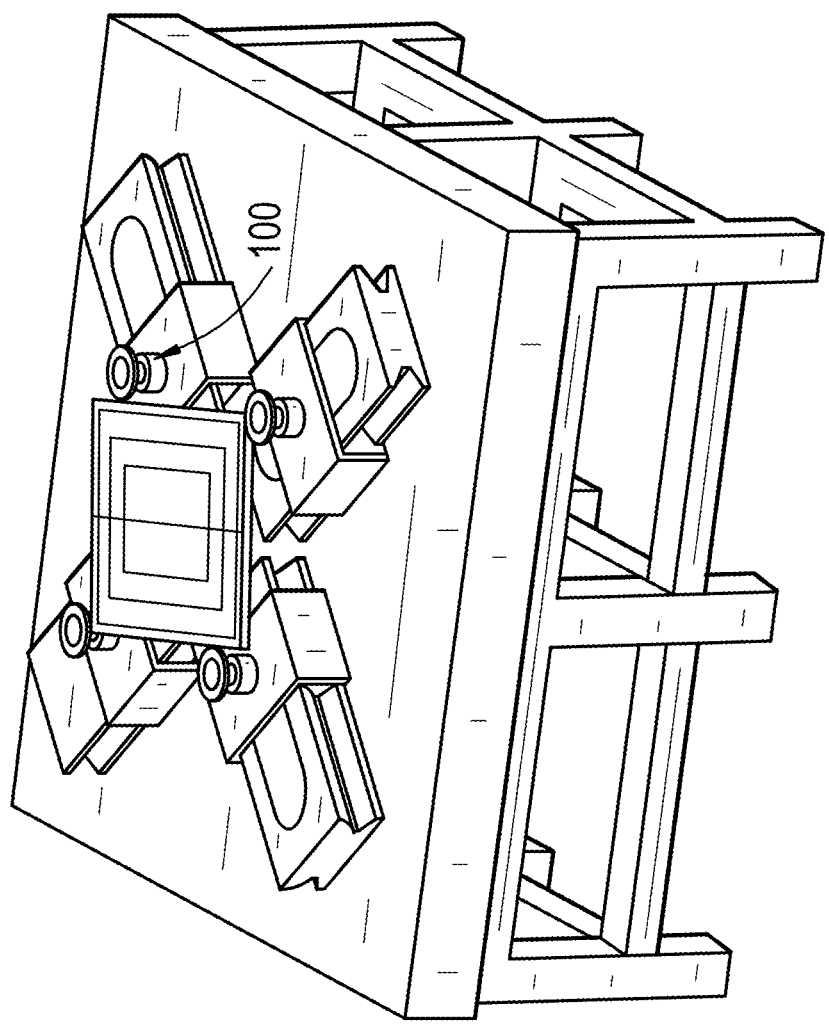

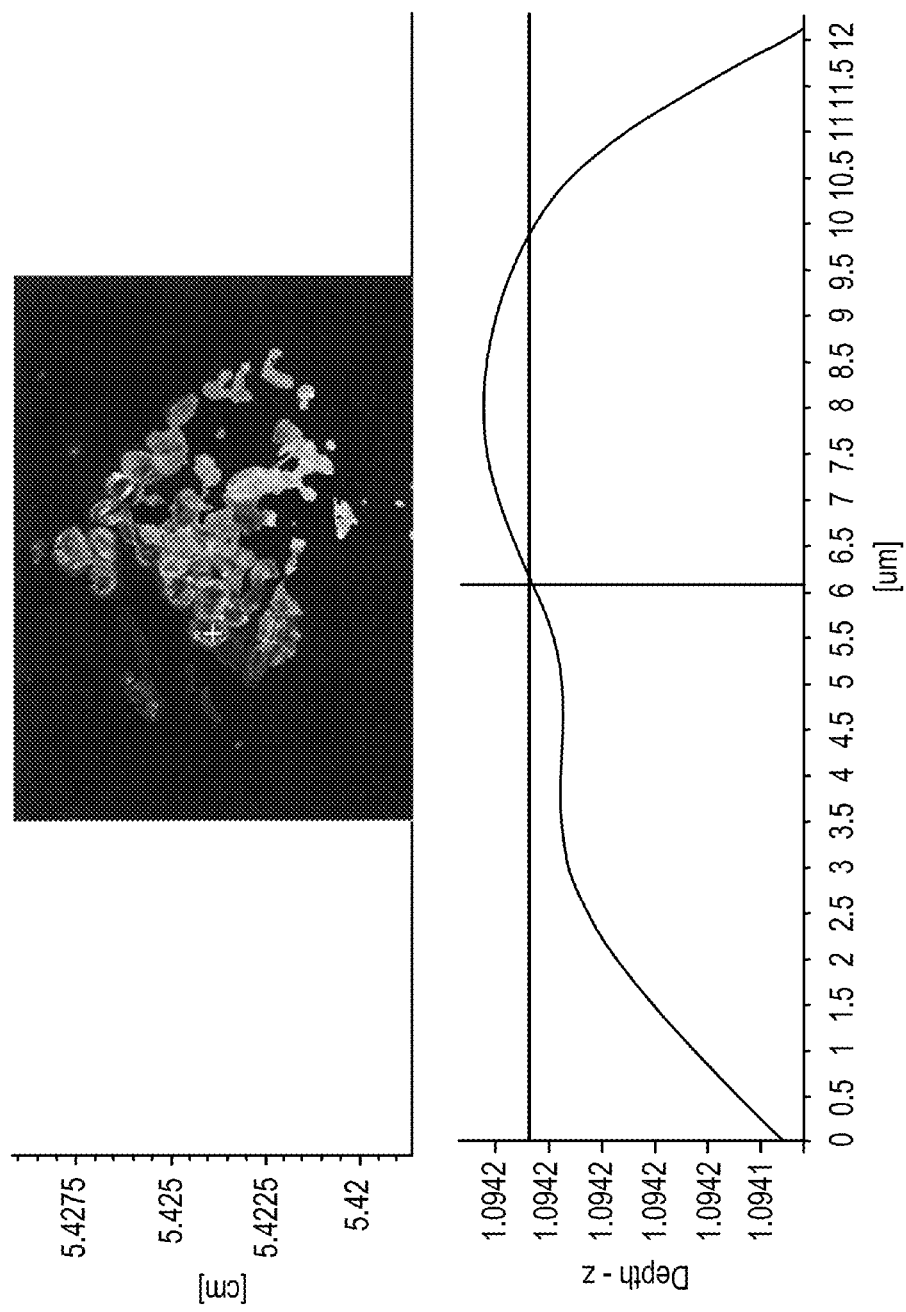

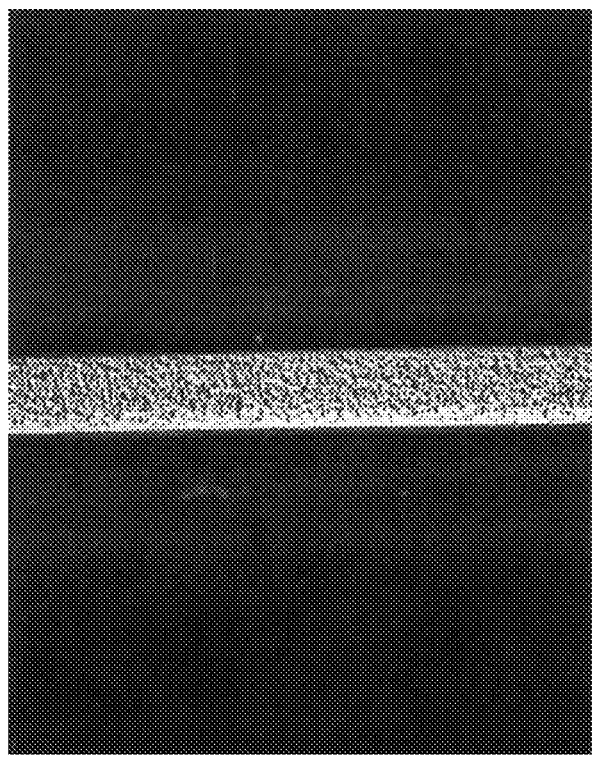
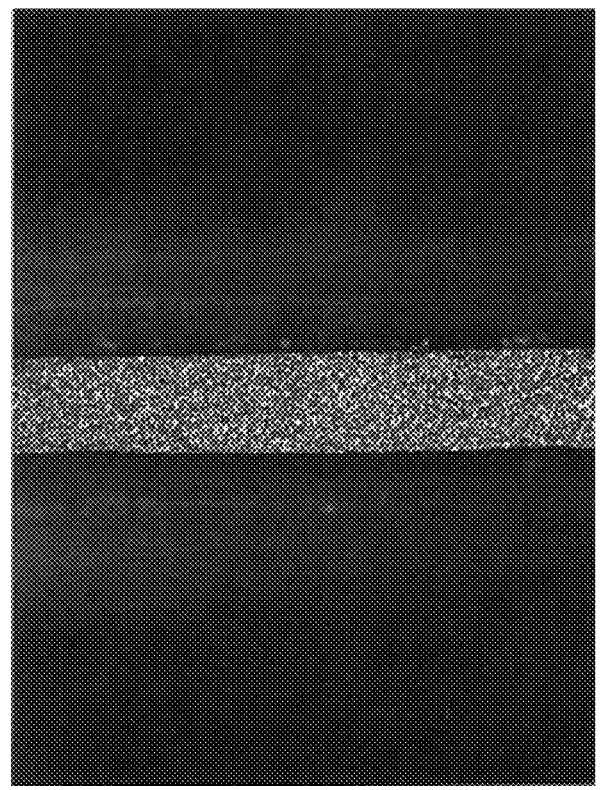
FIG. 19B
FIG. 19A

EDGE CHAMFERING BY MECHANICALLY PROCESSING LASER CUT GLASS

RELATED APPLICATION(S)

This application claims the benefit of priority under 35 U.S.C. § 365 of U.S. International Patent Application Serial No. PCT/US15/13026 filed on Jan. 27, 2015 designating the United States of America, which claims the benefit of U.S. Provisional Application Ser. No. 61/932,030 filed on Jan. 27, 2014, U.S. Provisional Application No. 62/022,885 filed on Jul. 10, 2014 and is a Continuation in Part of U.S. application Ser. No. 14/530,410 filed on Oct. 31, 2014, the entire disclosures of which are incorporated herein by reference.

BACKGROUND

The disclosure relates generally to glass chamfering methods, and more particularly to glass chamfering methods that utilize a laser in conjunction with mechanical finishing No admission is made that any reference cited herein constitutes prior art. Applicant expressly reserves the right to challenge the accuracy and pertinence of any cited documents.

In all cases where glass panels are cut for applications in architectural, automotive, consumer electronics, to mention a few areas, there will be edges, which will very likely require attention. There are as many different methods to cut and separate glass. For example, glass can be cut mechanically (CNC machining, abrasive water jet, scribing and breaking, etc.), using electro-magnetic radiation (lasers, electrical discharges, gyrotron, etc). The more traditional and common methods (scribe and break with CNC machining) create edges that are populated with different types and sizes of defects. It is also common to find that the edges are not perfectly perpendicular to the surfaces. In order to eliminate the defects and give the edges a more even surface with improved strength, they are usually first ground, and then polished by a progression of polishing wheels, thus requiring multiple steps. This process involves abrasive removal of edge material that can give it the desired finishing and also shape its form (bull nosed, chamfered, pencil shape, etc). In order to allow for the grinding and the following polishing steps, it is necessary to cut parts that are larger than the final desired dimensions.

While it is well known and understood that eliminating defects will increase edge strength, there is not an agreement on the impact that shape has on edge strength. The confusion occurs mainly because it is well known that shape helps to increase damage resistance to impact and handling of the edges. The fact is that edge shape really does not determine edge strength as defined by resistance to flexural (or bending) forces, but the defects size and distribution do have a great impact. However, a shaped edge does help to improve impact resistance by creating smaller cross section and containing defects. For example, an edge with a straight face that is perpendicular to both surfaces accumulates stress at these right angled corners that will chip and break when it is impacted by another object. Because of the accumulated stress, the size of defects can be pretty big, which will diminish the strength of that edge considerably. On the other hand, due to its smoother shape, a rounded "bull-nosed" shaped edge will have lower accumulated stress and smaller cross section which helps to reduce the size and penetration of defects into the volume of the edge. Therefore, after an impact, a shaped edge should have higher "bending" strength than a flat edge.

For the reasons discussed above, it is often desirable to have the edges shaped, as opposed to flat and perpendicular to the surfaces. One important aspect of these mechanical cutting and edge shaping methods is the degree of maintenance of the machines. Both for cutting and grinding, old and worn down cutting heads or grinding rolls can produce damage which can significantly affect the strength of the edges, even if the naked eye cannot see the differences. Other issues with mechanical processing methods that require mechanical cutting, followed by mechanical grinding and the subsequent mechanical multiple polishing steps is that they are very labor intensive and require many grinding and polishing steps until the final desired finish, which generate a lot of debris and require cleaning steps to avoid introduction of damages to the surfaces.

Subsurface damage, as manifested by small microcracks and material modification (such as hackle and lateral checks) caused by any cutting process, is a concern because they diminish the edge strength of brittle materials, particularly glass. Mechanical and ablative laser processes are particularly problematic in this regard, because three processes can inflict layers of subsurface damage ranging from about 100-200 µm, or more in depth. Edges produced with conventional processing typically require a considerable amount of post-cut grinding and polishing to remove the subsurface damage layer(s).

SUMMARY

Embodiments described herein relate to processes of chamfering and/or beveling an edge of a glass substrate of arbitrary shape using lasers in conjunction with mechanical polishing processing.

One embodiment of the disclosure relates a method for creating chamfers or bevels, the method comprising:
 focusing a pulsed laser beam into a laser beam focal line, viewed along the beam propagation direction;
 directing the laser beam focal line into the material at a first angle of incidence to the material, the laser beam focal line generating an induced absorption within the material, the induced absorption producing a defect line along the laser beam focal line within the material;
 translating the material and the laser beam relative to each other, thereby laser drilling a plurality of defect lines along a first plane at the first angle within the material;
 directing the laser beam focal line into the material at a second angle of incidence to the material, the laser beam focal line generating an induced absorption within the material, the induced absorption producing a defect line along the laser beam focal line within the material;
 translating the material and the laser beam relative to each other, thereby laser drilling a plurality of defect lines along a second plane at the second angle within the material, the second plane intersecting the first plane,
 separating the material along the first plane and the second plane and producing the laser cut material; and
 polishing laser cut material by a compliant wheel.

One embodiment of the disclosure relates to a method for creating chamfers or bevels work piece, the method comprising:
 focusing a pulsed laser beam into a laser beam focal line, viewed along the beam propagation direction;
 directing the laser beam focal line into the workpiece at an angle of incidence to the workpiece, the angle intersecting an edge of the workpiece, the laser beam focal line generating an induced absorption within the workpiece, the induced absorption producing a defect line along the laser beam focal line within the workpiece;

translating the workpiece and the laser beam relative to each other, thereby laser drilling a plurality of defect lines along a plane at the angle within the workpiece; and separating the workpiece along the plane to create a laser cut workpiece; and polishing laser cut workpiece by a compliant polishing wheel having a bulk modulus of elasticity of 0.1 GPa to 5 GPa.

According to some embodiments polishing the cut surface of the laser cut workpiece is performed with the polishing wheel for a time t, where 1 sec<t<1 min, for example 5 sec to 30 sec.

Thus, one embodiment of the disclosure relates to a method for creating chamfers or bevels work piece, the method comprising:

focusing a pulsed laser beam into a laser beam focal line, viewed along the beam propagation direction;

directing the laser beam focal line into the workpiece at an angle of incidence to the workpiece, the angle intersecting an edge of the workpiece, the laser beam focal line generating an induced absorption within the workpiece, the induced absorption producing a defect line along the laser beam focal line within the workpiece;

translating the workpiece and the laser beam relative to each other, thereby laser drilling a plurality of defect lines along a plane at the angle within the workpiece; and separating the workpiece along the plane to create a laser cut workpiece with a cut surface; and polishing the cut surface of the laser cut workpiece with a polishing wheel for a time t, where 1 sec<t<1 min, wherein the polishing wheel has a bulk modulus of elasticity of 0.1 GPa to 5 GPa.

According to some embodiments the laser cut surface workpiece is polished very quickly, i.e., the total edge finishing step of the cut surface, —i.e., the total polishing time polishing time t is: 1 sec<t<1 min. According to some embodiments t≤30 sec, and in some embodiments all of the exterior edges of the workpiece cut by the laser were finished in ≤10 sec.

According to some embodiments the laser laser is a burst pulse laser with the pulse duration is in a range of between greater than about 5 picoseconds and less than about 20 picoseconds, the burst repetition rate is in a range of between about 1 kHz and 2 MHz, and 2-25 pulses per bust. According to some embodiments the laser power of the burst pulse laser is 10 W-100 W.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

FIG. 4 is an illustration of a second optical assembly for laser drilling.

FIGS. 5A and 5B are illustrations of a third optical assembly for laser drilling.

FIG. 7B illustrates a process of creating a chamfered edge with defect lines.

FIG. 7C illustrates laser chamfering of glass edges using a focused and angled ultrashort laser that generates defect lines along pre-determined planes. Top shows an example using 3 defect line planes compared to just two for the bottom images.

FIG. 9 illustrates using defect lines which remain after the cut part is released to serve as sacrificial regions, arresting the propagation of cracks caused by impact to the edges of the part.

FIG. 10A is an illustration of a cut part with internal defect lines being placed into ion-exchange, which adds enough stress to remove the perforated edges and form the desired edge chamfer.

FIG. 10B an illustration of a cut part with internal defect lines being placed into ion-exchange (IOX) to release chamfered corners, similar to the illustration shown in FIG. 10A, but with only two defect line planes.

FIG. 10C is an illustration of a chamfer with many angles (more than 3 defect line planes.

FIG. 12C is a schematic diagram of the edge profile obtained when parts are laser cut with a 45° edge chamfer.

FIG. 14 illustrates schematically one embodiment of a constant force polishing Apparatus.

FIG. 16 illustrates nominal abrasive size estimation of the compliant polishing wheel of FIGS. 15A-15E.

FIGS. 19A and 19B are Apex Microscope Images, respectively, of laser cut substrate edges prior and post mechanical polishing by the wheel according to one embodiment.

DETAILED DESCRIPTION

A description of exemplary embodiments follows.

Embodiments described herein relate to processes of chamfering and/or beveling an edge of a glass substrate and other transparent materials of arbitrary shape using lasers. A first embodiment involves cutting the edge with the desired chamfer shape utilizing an ultra-short pulse laser that may be optionally followed by a other process steps for fully automated separation. In the first method, the process fundamental step is to create fault lines on intersecting planes that delineate the desired edge shape and establish a path of least resistance for crack propagation and hence separation and detachment of the shape from its substrate matrix. This method essentially creates the shaped edge while cutting the part out of the main substrate. The laser separation method can be tuned and configured to enable manual separation, partial separation, or self-separation of the shaped edges out of the original substrate. The underlying principle to generate these fault lines is described in detail below and in U.S. Application No. 61/752,489 filed on Jan. 15, 2013.

Figure 1A:
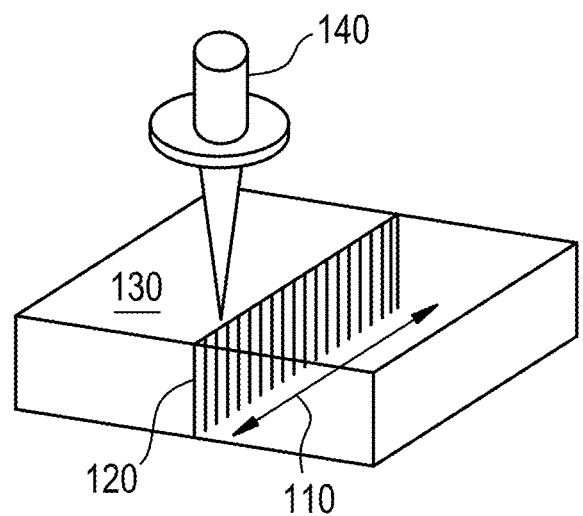
FIGS. 1A-1C are illustrations of a fault line with equally spaced defect lines of modified glass.
Figure 1B:
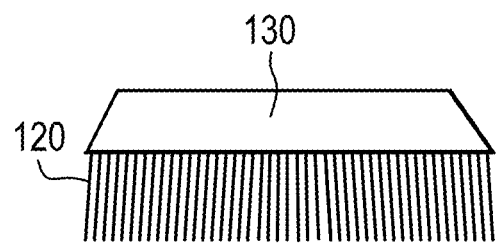
Figure 1C:
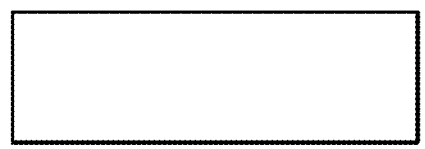

In the first step the object to be processed is irradiated with an ultra-short pulsed laser beam that is condensed into a high aspect ratio line focus that penetrates through the thickness of the substrate. Within this volume of high energy density the material is modified via nonlinear effects. It is important to note that without this high optical intensity, nonlinear absorption is not triggered. Below this intensity threshold, the material is transparent to the laser radiation and remains in its original state as shown in FIGS. 1A-1C. By scanning the laser over a desired line or path a narrow defect line is created (a few microns wide) and define the perimeter or shape to be separated in the next step. The particular laser method used (described below) has the advantage that in a single pass, it creates highly controlled full line perforation through the material, with extremely little (<75 µm, preferably <60 µm, often <50 µm, and in some embodiments ≤40 µm) subsurface damage and debris generation. This is in contrast to the typical use of spot-focused laser to ablate material, where multiple passes are often necessary to completely perforate the glass thickness, large amounts of debris are formed from the ablation process, and more extensive sub-surface damage (>100 µm) and edge chipping occur.

Figure 2A:
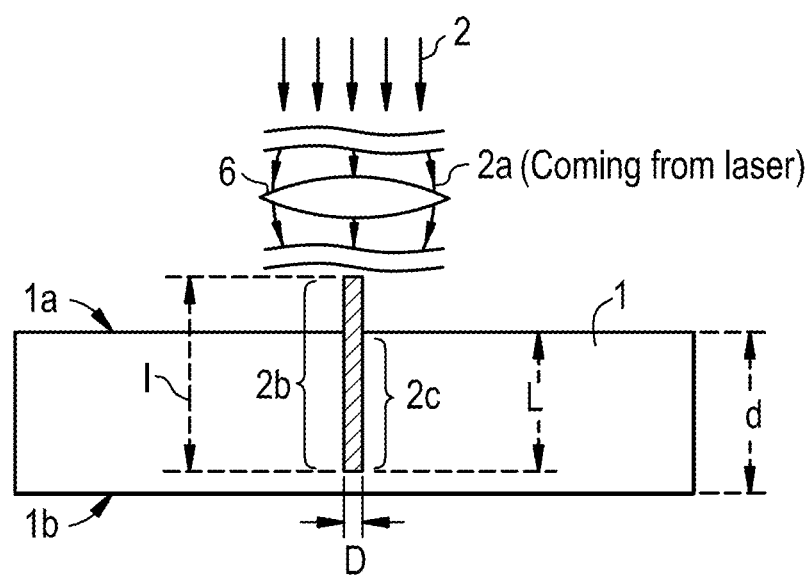
FIGS. 2A and 2B are illustrations of positioning of the laser beam focal line, i.e., the processing of a material transparent for the laser wavelength due to the induced absorption along the focal line.
Figure 2B:
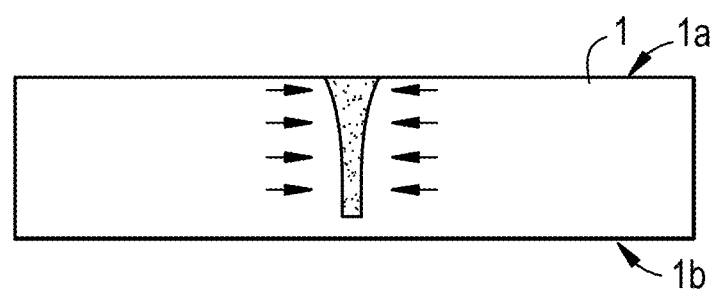
Figure 3A:
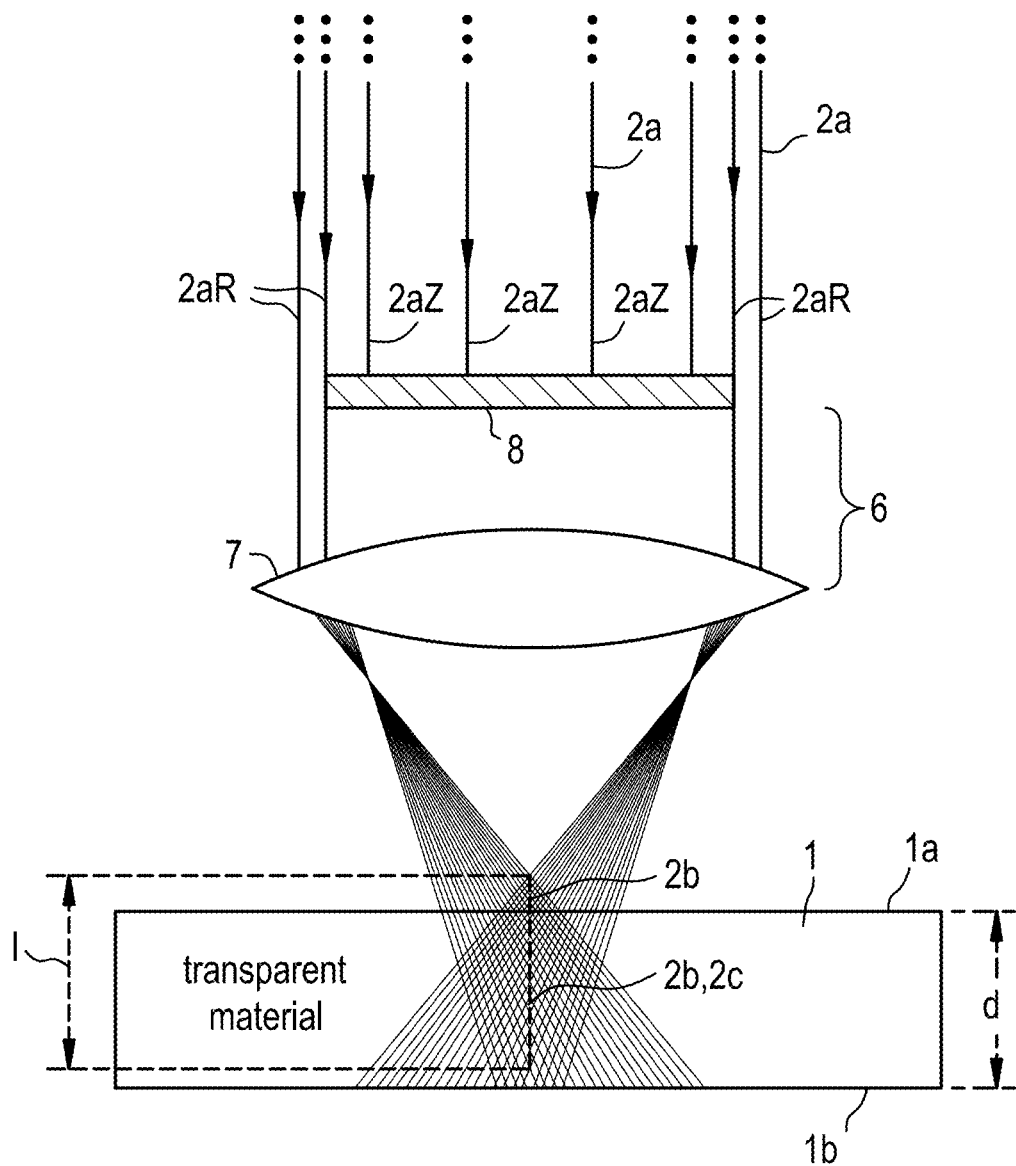
FIG. 3A is an illustration of an optical assembly for laser drilling.

Turning to FIGS. 2A and 2B, a method of laser drilling a material includes focusing a pulsed laser beam 2 into a laser beam focal line 2b, viewed along the beam propagation direction. As shown in FIG. 3A, laser 3 (not shown) emits laser beam 2, at the beam incidence side of the optical assembly 6 referred to as 2a, which is incident onto the optical assembly 6. The optical assembly 6 turns the incident laser beam into an extensive laser beam focal line 2b on the output side over a defined expansion range along the beam direction (length l of the focal line). The planar substrate 1 to be processed is positioned in the beam path after the optical assembly overlapping at least partially the laser beam focal line 2b of laser beam 2. Reference 1a designates the surface of the planar substrate facing the optical assembly 6 or the laser, respectively, reference 1b designates the reverse surface of substrate 1 usually spaced in parallel. The substrate thickness (measured perpendicularly to the planes 1a and 1b, i.e., to the substrate plane) is labeled with d.

As FIG. 2A depicts, substrate 1 is aligned perpendicularly to the longitudinal beam axis and thus behind the same focal line 2b produced by the optical assembly 6 (the substrate is perpendicular to the drawing plane) and viewed along the beam direction it is positioned relative to the focal line 2b in such a way that the focal line 2b viewed in beam direction starts before the surface 1a of the substrate and stops before the surface 1b of the substrate, i.e. still within the substrate. In the overlapping area of the laser beam focal line 2b with substrate 1, i.e. in the substrate material covered by focal line 2b, the extensive laser beam focal line 2b thus generates (in case of a suitable laser intensity along the laser beam focal line 2b which is ensured due to the focusing of laser beam 2 on a section of length l, i.e. a line focus of length l) an extensive section 2c viewed along the longitudinal beam direction, along which an induced absorption is generated in the substrate material which induces a defect line or crack formation in the substrate material along section 2c. The defect line formation is not only local, but over the entire length of the extensive section 2c of the induced absorption. The length of section 2c (i.e., after all, the length of the overlapping of laser beam focal line 2b with substrate 1) is labeled with reference L. The average diameter or the average extension of the section of the induced absorption (or the sections in the material of substrate 1 undergoing the defect line formation) is labeled with reference D. This average extension D basically corresponds to the average diameter δ of the laser beam focal line 2b, that is, an average spot diameter in a range of between about 0.1 µm and about 5 µm.

As FIG. 2A shows, substrate material transparent for the wavelength λ of laser beam 2 is heated due to the induced absorption along the focal line 2b. FIG. 2B outlines that the warming material will eventually expand so that a correspondingly induced tension leads to micro-crack formation, with the tension being the highest at surface 1a.

Concrete optical assemblies 6, which can be applied to generate the focal line 2b, as well as a concrete optical setup, in which these optical assemblies can be applied, are described below. All assemblies or setups are based on the description above so that identical references are used for identical components or features or those which are equal in their function. Therefore only the differences are described below.

As the parting face eventually resulting in the separation is or must be of high quality (regarding breaking strength, geometric precision, roughness and avoidance of re-machining requirements), the individual focal lines to be positioned on the substrate surface along parting line 5 should be preferably generated using the optical assembly described below (hereinafter, the optical assembly is alternatively also referred to as laser optics). The roughness results particularly from the spot size or the spot diameter of the focal line. In order to achieve a small spot size of, for example, 0.5 µm to 2 µm in case of a given wavelength λ of laser 3 (interaction with the material of substrate 1), certain requirements are usually imposed on the numerical aperture of laser optics 6. These requirements are met by laser optics 6 described below.

In order to achieve the required numerical aperture, the optics preferably should, on the one hand, dispose of the required opening for a given focal length, according to the known Abbé formulae (N.A.=n sin (theta), n: refractive index of the glass to be processed, theta: half the aperture angle; and theta=arc tan (D/2f); D: aperture, f: focal length). On the other hand, the laser beam should preferably illuminate the optics up to the required aperture, which is typically achieved by means of beam widening using widening telescopes between laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

According to FIG. 3A (section perpendicular to the substrate plane at the level of the central beam in the laser beam bundle of laser radiation 2; here, too, laser beam 2 is incident perpendicularly to the substrate plane, i.e. angle β is 0° so that the focal line 2b or the extensive section of the induced absorption 2c is parallel to the substrate normal), the laser radiation 2a emitted by laser 3 is first directed onto a circular aperture 8 which is completely opaque for the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely absorbed by it. Only the beams in the outer perimeter range of beam bundle 2a (marginal rays, here labeled with 2aR) are not absorbed due to the reduced aperture size compared to the beam diameter, but pass aperture 8 laterally and hit the marginal areas of the focusing optic elements of the optical assembly 6, which is designed as a spherically cut, bi-convex lens 7 here.

Lens 7 centered on the central beam is deliberately designed as a non-corrected, bi-convex focusing lens in the form of a common, spherically cut lens. Put another way, the spherical aberration of such a lens is deliberately used. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (beam bundle diameter defined by the extension to the decrease to 1/e) and approximately 75% of the diameter of the lens of the optical assembly 6. The focal line 2b of a not aberration-corrected spherical lens 7 generated by blocking out the beam bundles in the center is thus used. FIG. 3A shows the section in one plane through the central beam, the complete three-dimensional bundle can be seen when the depicted beams are rotated around the focal line 2b.

One disadvantage of this focal line is that the conditions (spot size, laser intensity) along the focal line, and thus along the desired depth in the material, vary and that therefore the desired type of interaction (no melting, induced absorption, thermal-plastic deformation up to crack formation) may possibly only be selected in a part of the focal line. This means in turn that possibly only a part of the incident laser light is absorbed in the desired way. In this way, the efficiency of the process (required average laser power for the desired separation speed) is impaired on the one hand, and on the other hand the laser light might be transmitted into undesired deeper places (parts or layers adherent to the substrate or the substrate holding fixture) and interact there in an undesirable way (heating, diffusion, absorption, unwanted modification).

Figures 1, 3B:
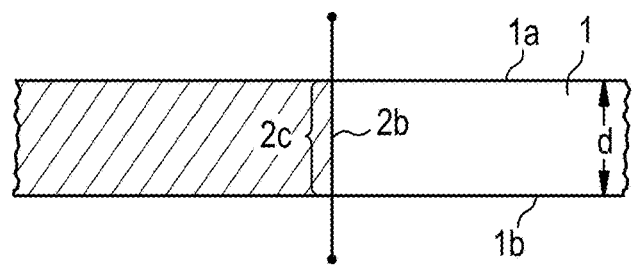
FIGS. 3B1-3B4 are an illustrations of various possibilities to process the substrate by differently positioning the laser beam focal line relative to the substrate.
Figures 2, 3B:
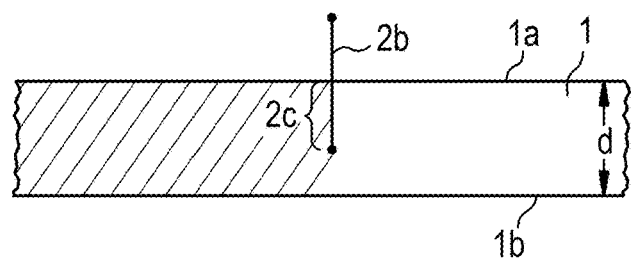
Figures 3, 3B:
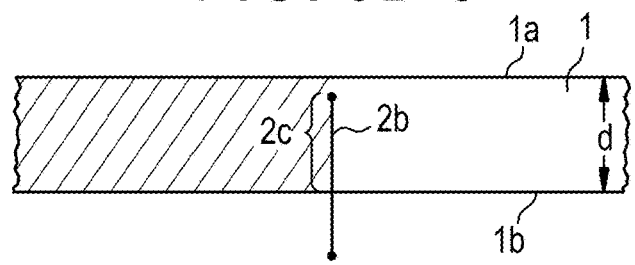
Figures 3, 3B, 4:
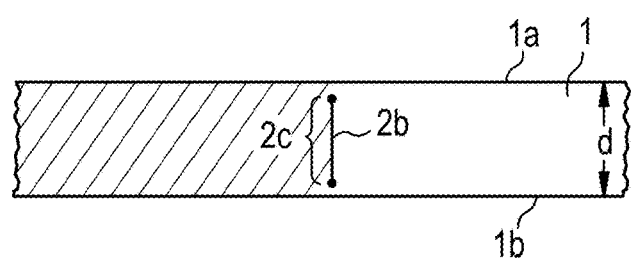
Figure 4:
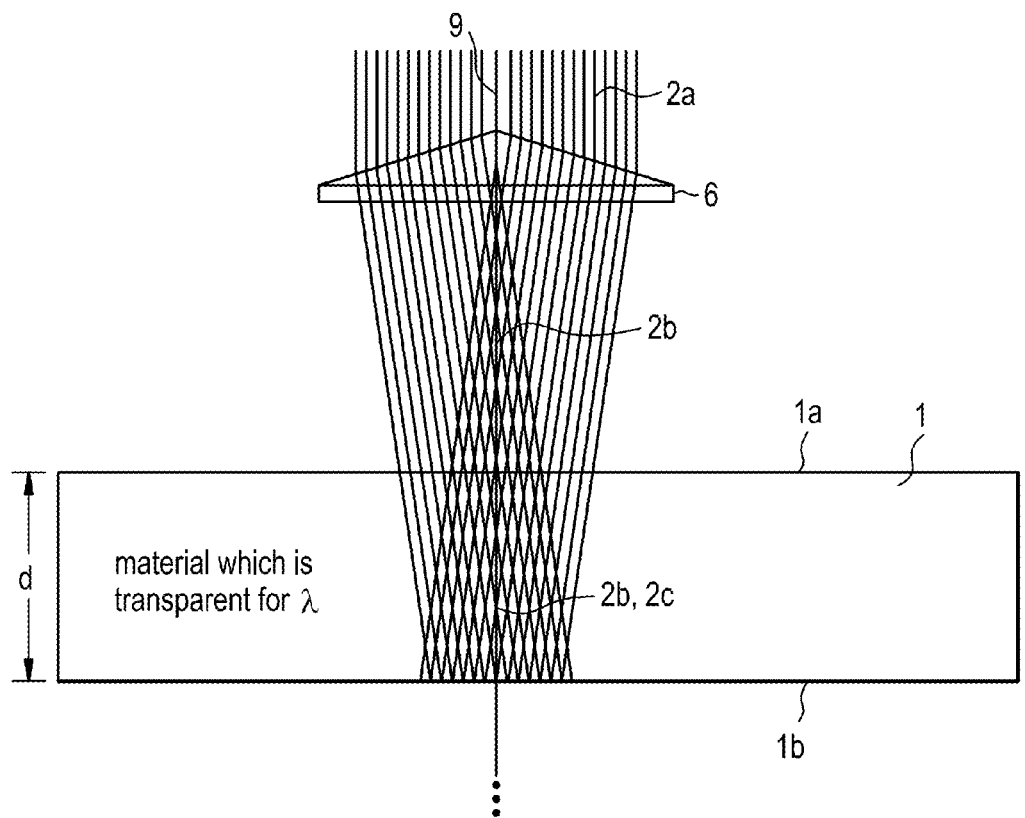

FIG. 3B-1-4 show (not only for the optical assembly in FIG. 3A, but basically also for any other applicable optical assembly 6) that the laser beam focal line 2b can be positioned differently by suitably positioning and/or aligning the optical assembly 6 relative to substrate 1 as well as by suitably selecting the parameters of the optical assembly 6: As FIG. 3B-1 outlines, the length l of the focal line 2b can be adjusted in such a way that it exceeds the substrate thickness d (here by factor 2). If substrate 1 is placed (viewed in longitudinal beam direction) centrally to focal line 2b, an extensive section of induced absorption 2c is generated over the entire substrate thickness.

In the case shown in FIG. 3B-2, a focal line 2b of length l is generated which corresponds more or less to the substrate extension d. As substrate 1 relative to line 2 is positioned in such a way that line 2b starts in a point before, i.e. outside the substrate, the length L of the extensive section of induced absorption 2c (which extends here from the substrate surface to a defined substrate depth, but not to the reverse surface 1b) is smaller than the length l of focal line 2b. FIG. 3B-3 shows the case in which the substrate 1 (viewed along the beam direction) is partially positioned before the starting point of focal line 2b so that, here too, it applies to the length l of line 2b l>L (L=extension of the section of induced absorption 2c in substrate 1). The focal line thus starts within the substrate and extends over the reverse surface 1b to beyond the substrate. FIG. 3B-4 finally shows the case in which the generated focal line length l is smaller than the substrate thickness d so that—in case of a central positioning of the substrate relative to the focal line viewed in the direction of incidence—the focal line starts near the surface 1a within the substrate and ends near the surface 1b within the substrate (l=0.75·d).

It is particularly advantageous to realize the focal line positioning in such a way that at least one surface 1a, 1b is covered by the focal line, i.e. that the section of induced absorption 2c starts at least on one surface. In this way it is possible to achieve virtually ideal drilling or cutting avoiding ablation, feathering and particulation at the surface.

FIG. 4 depicts another applicable optical assembly 6. The basic construction follows the one described in FIG. 3A so that only the differences are described below. The depicted optical assembly is based on the use of optics with a non-spherical free surface in order to generate the focal line 2b, which is shaped in such a way that a focal line of defined length l is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is principally known to one skilled in the art; the cone angle in the example is 10°. The apex of the axicon labeled here with reference 9 is directed towards the incidence direction and centered on the beam center. As the focal line 2b of the axicon 9 already starts in its interior, substrate 1 (here aligned perpendicularly to the main beam axis) can be positioned in the beam path directly behind axicon 9. As FIG. 4 shows, it is also possible to shift substrate 1 along the beam direction due to the optical characteristics of the axicon without leaving the range of focal line 2b. The extensive section of the induced absorption 2c in the material of substrate 1 therefore extends over the entire substrate depth d.

However, the depicted layout is subject to the following restrictions: As the focal line of axicon 9 already starts within the lens, a significant part of the laser energy is not focused into part 2c of focal line 2b, which is located within the material, in case of a finite distance between lens and material. Furthermore, length l of focal line 2b is related to the beam diameter for the available refraction indices and cone angles of axicon 9, which is why, in case of relatively thin materials (several millimeters), the total focal line may be too long, having the effect that the laser energy is again not specifically (or not totally) focused into the material.

This is the reason for an enhanced optical assembly 6 which comprises both an axicon and a focusing lens. FIG. 5A depicts such an optical assembly 6 in which a first optical element (viewed along the beam direction) with a non-spherical free surface designed to form an extensive laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in beam direction at a distance z1 from the axicon 10. The distance z1, in this case approximately 300 mm, is selected in such a way that the laser radiation formed by axicon 10 circularly incides on the marginal area of lens 11. Lens 11 focuses the circular radiation on the output side at a distance z2, in this case approximately 20 mm from lens 11, on a focal line 2b of a defined length, in this case 1.5 mm. The effective focal length of lens 11 is 25 mm here. The circular transformation of the laser beam by axicon 10 is labeled with the reference SR.

Figure 5B:
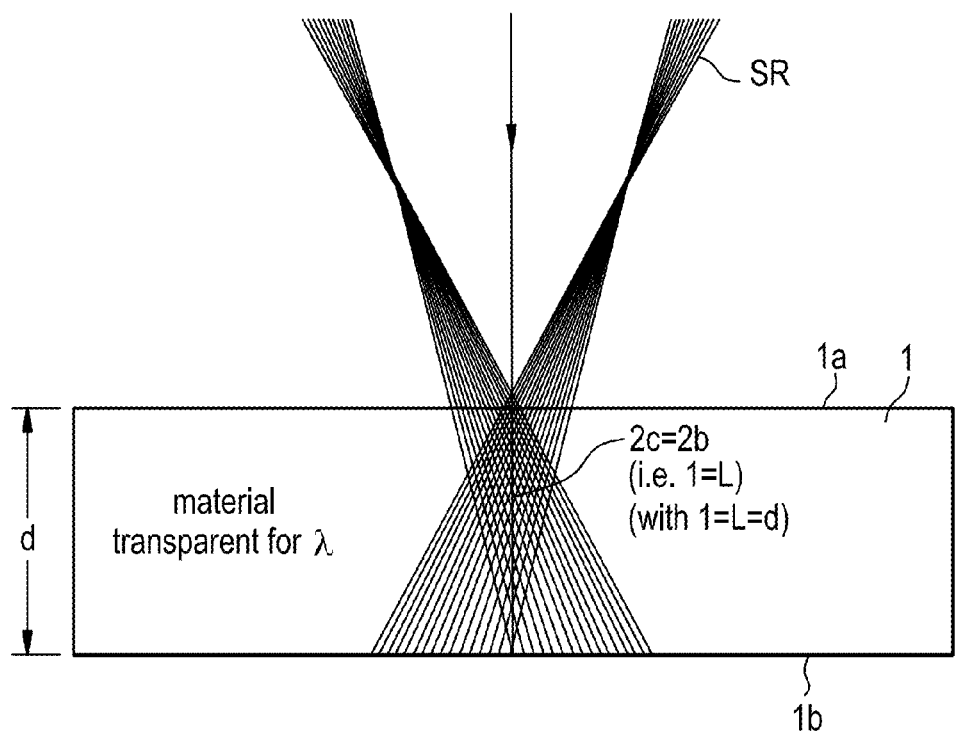

FIG. 5B depicts the formation of the focal line 2b or the induced absorption 2c in the material of substrate 1 according to FIG. 5A in detail. The optical characteristics of both elements 10, 11 as well as the positioning of them is selected in such a way that the extension 1 of the focal line 2b in beam direction is exactly identical with the thickness d of substrate 1. Consequently, an exact positioning of substrate 1 along the beam direction is required in order to position the focal line 2b exactly between the two surfaces 1a and 1b of substrate 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly on a required zone, which, on the one hand, serves to realize the required numerical aperture and thus the required spot size, on the other hand, however, the circle of diffusion diminishes in intensity after the required focal line 2b over a very short distance in the center of the spot, as a basically circular spot is formed. In this way, the defect line formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length l of focal line 2b can be adjusted via the beam diameter on the axicon. The numerical aperture along the focal line, on the other hand, can be adjusted via the distance z1 axicon-lens and via the cone angle of the axicon. In this way, the entire laser energy can be concentrated in the focal line.

If the defect line formation is supposed to continue to the emergence side of the substrate, the circular illumination still has the advantage that, on the one hand, the laser power is used in the best possible way as a large part of the laser light remains concentrated in the required length of the focal line, on the other hand, it is possible to achieve a uniform spot size along the focal line—and thus a uniform separation process along the focal line—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it is preferable to select a very small beam diameter of the laser beam incident on the axicon. This has the practical disadvantage that the centering of the beam onto the apex of the axicon should be very precise and that therefore the result is very sensitive to direction variations of the laser (beam drift stability). Furthermore, a tightly collimated laser beam is very divergent, i.e. due to the light deflection the beam bundle becomes blurred over short distances.

Turning back to FIG. 6, both effects can be avoided by inserting another lens, a collimating lens 12: this further, positive lens 12 serves to adjust the circular illumination of focusing lens 11 very tightly. The focal length f' of collimating lens 12 is selected in such a way that the desired circle diameter dr results from distance z1a from the axicon to the collimating lens 12, which is equal to f'. The desired width br of the ring can be adjusted via the distance z1b (collimating lens 12 to focusing lens 11). As a matter of pure geometry, the small width of the circular illumination leads to a short focal line. A minimum can be achieved at distance f'.

Figure 6:
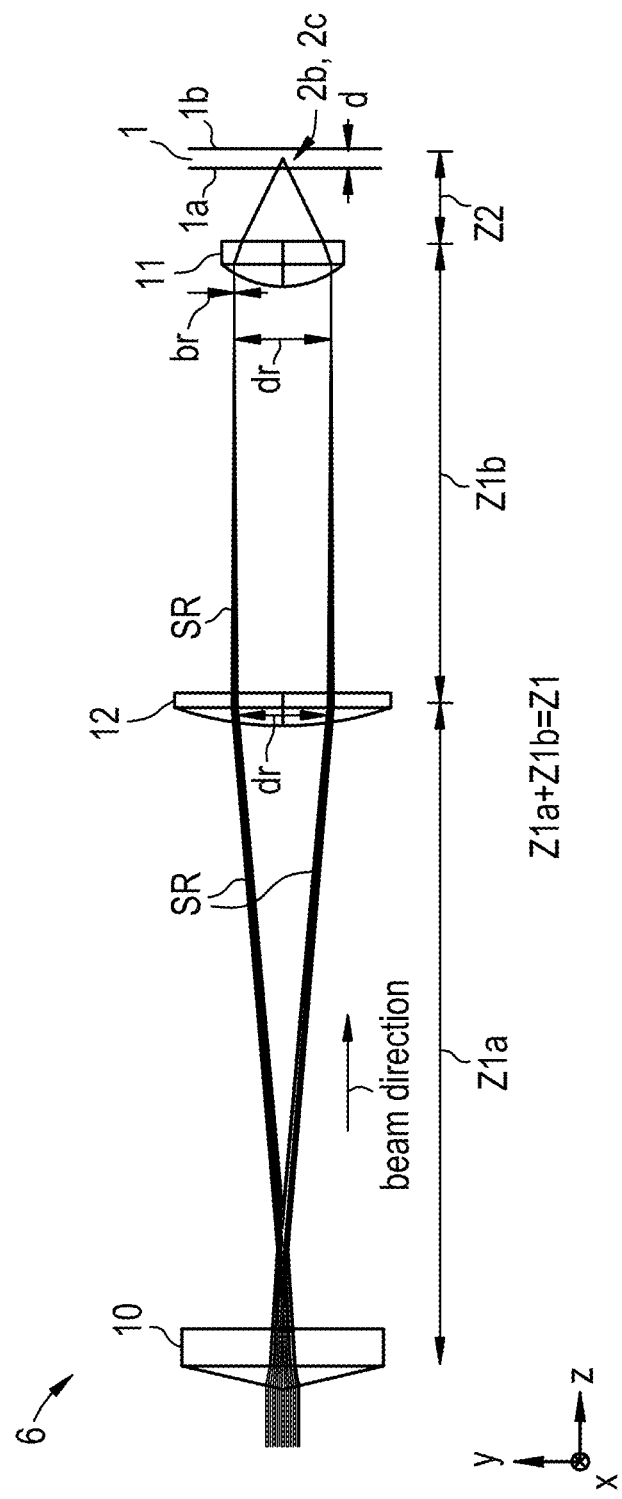
FIG. 6 is a schematic illustration of a fourth optical assembly for laser drilling.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as z1a, the distance of focusing lens 11 from collimating lens 12 as z1b, and the distance of the generated focal line 2b from the focusing lens 11 as z2 (always viewed in beam direction). As shown in FIG. 6, the circular radiation SR formed by axicon 10, which incides divergently and under the circle diameter dr on the collimating lens 12, is adjusted to the required circle width br along the distance z1b for an at least approximately constant circle diameter dr at the focusing lens 11. In the case shown, a very short focal line 2b is supposed to be generated so that the circle width br of approximately 4 mm at lens 12 is reduced to approximately 0.5 mm at lens 11 due to the focusing properties of lens 12 (circle diameter dr is 22 mm in the example).

In the depicted example it is possible to achieve a length of the focal line 1 of less than 0.5 mm using a typical laser beam diameter of 2 mm, a focusing lens 11 with a focal length f=25 mm, and a collimating lens with a focal length f'=150 mm. Furthermore, in this embodiment Z1a=Z1b=140 mm and Z2=15 mm.

Once the lines with defects are created (also called herein fault lines or perforations), separation can occur via: manual or mechanical stress applied on or around the fault line; the stress or pressure should create tension that pulls both sides of the fault line apart and break the areas that are still bonded together. Separation depends on several of the process parameters, such as laser scan speed, laser power, parameters of lenses, pulse width, repetition rate, etc.

Figure 7A:
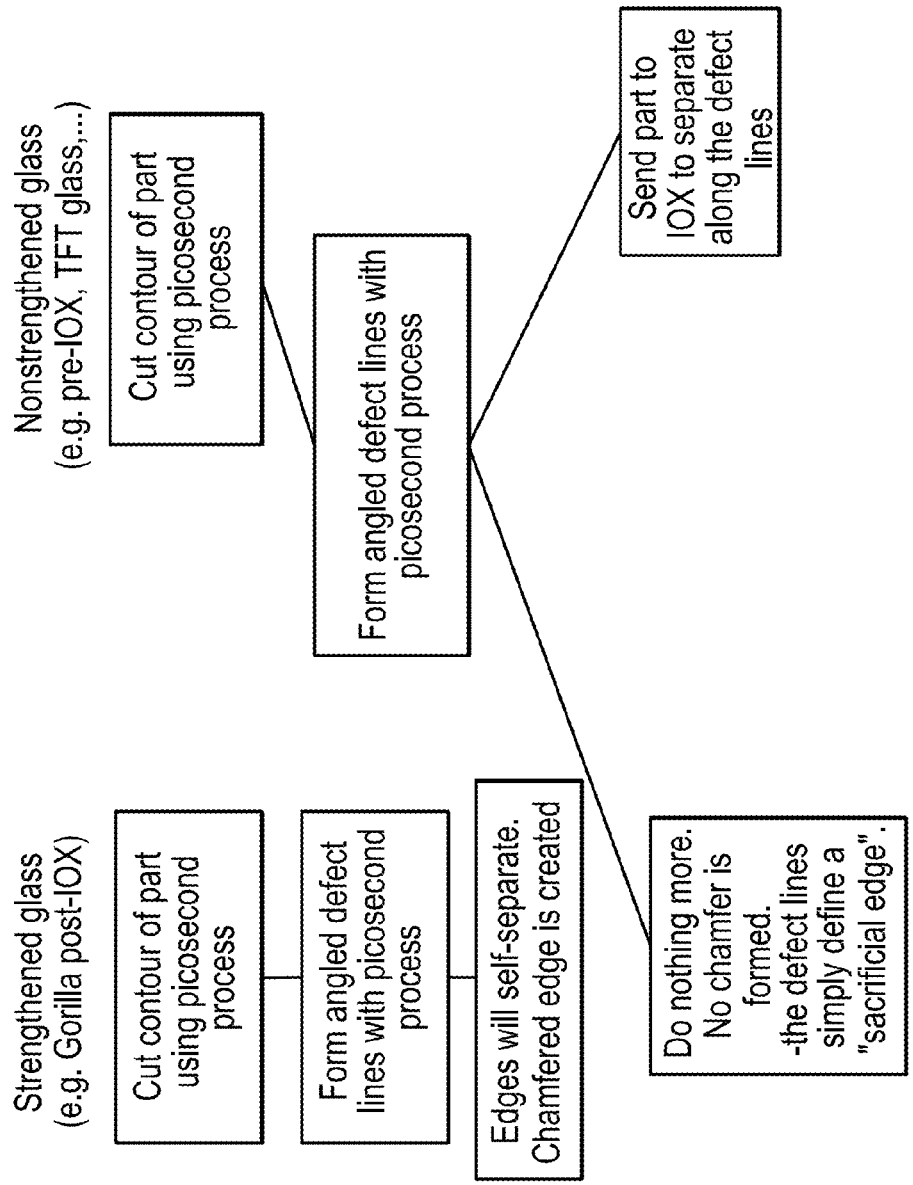
FIG. 7A is a flow chart of the various methods described in the present application to form a more robust edge—creating chamfers and sacrificial edges.

FIG. 7A gives an overview of the processes described in the present application.

In the method for forming the desired shapes and edges using the short-pulse laser, the developed process relies on the material transparency to the laser wavelength in linear regime, or low laser intensity, which allows maintenance of a clean and high (or pristine) surface quality and on the reduced subsurface damage created by the area of high intensity around the laser focus. One of the important parameters of this process is the high aspect ratio of the defect created by the ultra-short pulsed laser. It allows creation of a long and deep fault or defect line that can extend from the top to the bottom surfaces of the material to be cut and chamfered. In principle, each defect can be created by a single pulse and if necessary, additional pulses can be used to increase the extension of the affected area (depth and width).

There are several methods to create that defect line. The optical method of forming the line focus can take multiple forms, using donut shaped laser beams and spherical lenses, axicon lenses, diffractive elements, or other methods to form the linear region of high intensity. The type of laser (picosecond, femtosecond, etc.) and wavelength (IR, green, UV, etc.) can also be varied, as long as sufficient optical intensities are reached to create breakdown of the substrate material.

In the present embodiment an ultra-short pulsed laser is used to create this high aspect ratio vertical defect line in a consistent, controllable and repeatable manner. The detail of the optical setup that enables the creation of this vertical defect line is described above. This embodiment utilizes an axicon lens element in an optical lens assembly to create a region of high aspect ratio taper-free microchannel using ultra-short (picoseconds or femtosecond duration) Bessel beams. In other words, the axicon condenses the laser beam into a region of cylindrical shape and high aspect ratio (long length and small diameter). Due to the high intensity created with the condensed laser beam, nonlinear interaction of the laser electromagnetic field and the material occurs and the laser energy is transferred to the substrate. However, it is important to realize that in the areas where the laser energy intensity is not high (i.e., glass surface, glass volume surrounding the central convergence line), nothing happens to the glass as the laser intensity is below the nonlinear threshold. As illustrated in FIGS. 1A-1C, the method to cut and separate the glass substrate is essentially based on creating a fault line on the material to be processed with an ultra-short pulsed laser. The specific chosen process parameters will depend on the material properties (absorption, CTE, stress, composition, etc.) and laser parameters chosen for processing.

In some cases, the created fault line is not enough to separate it automatically and a secondary step may be necessary. If so desired, in the case of non-chemically strengthened glass, separation can be achieved, after the creation of a defect line, by application of mechanical force. Using the same principle illustrated in FIGS. 1A-1C to separate a glass substrate with flat edges, the process to produce chamfered edges can be modified as illustrated in FIG. 7A. To separate the glass and to form a good quality chamfered edge, for example, in one embodiment we create three separate planes of defect lines that intersect and define the boundaries of the shape. A different shape can be created by using, for example, just two intersecting defect line planes as illustrated in FIG. 7C, but the flat part of the edge has to be broken/separated without any defect lines. It should be possible to separate the corner at the defect line plane with the proper combination of defect line characteristics and treatment with IOX bath. For example, the defect lines may be formed at an $\theta_i$, with respect to the normal to the flat surface of the glass substrate, In some embodiments angle $0°<\theta_i<90°$. For example, a chamfered edge on the bottom of FIG. 7B was produced by 3 intersecting planes, each containing a plurality of defect lines.

Laser and Optical System:

For example, for the purpose of cutting glass or other transparent brittle materials, a process was developed that uses a (for example, 1064 nm, or 532 nm, 266 nm, or 261 nm) picosecond laser in combination with line-focus beam forming optics to create lines of damage (i.e., defect lines) in the substrates. A sample Corning® Gorilla® Glass code 2320 substrate with 0.7 mm thickness is positioned so that it is within the line-focus. With a line-focus of ~1 mm extension, and a picosecond laser that produces output power of ~>30 W at a repetition rate of 200 kHz (~150 µJ/pulse), the optical intensities in the line region can easily be high enough to create non-linear absorption in the material. A region of damaged, ablated, vaporized, or otherwise modified material is created that approximately follows the linear region of high intensity.

Note that the typical operation of such a picosecond laser creates a "burst" of pulses. (See, for example, FIGS. 8A and 8B). Each "burst" may contain multiple pulses (also termed sub-pulses herein) of very short duration (for example, ~10 psec). Each sub-pulse or individual pulse within a burst is separated in time by, for example by approximately 20 nsec (50 MHz), with the time often governed by the laser cavity design. The time between each "burst" will be much longer, often ~5 µsec, for a laser repetition rate of ~200 kHz. The exact timings, pulse durations, and repetition rates can vary depending on the laser design. But short pulses (<15 psec) of high intensity have been shown to work well with this technique.

For example, each burst of pulses may contain two pulses (also referred to as sub-pulses herein) or more (such as 3 pulses, 4 pulses, 5 pulses, 10 pulses, 15 pulses, 20 pulses, 22 pulses, 25 pulses, or more pulses within a burst) separated from each other by a duration in a range of between about 1 nsec and about 50 nsec, for example, 10 nsec to 50 nsec (e.g., about 20 nsec, or 30 nsec), and the burst repetition frequency (i.e., separation between the first pulses in two subsequent bursts) can be in a range of between about 1 kHz and about 200 kHz. The pulsed laser beam can have a wavelength selected such that the material is substantially transparent at this wavelength. Within the context of the present disclosure, a material is substantially transparent to the laser wavelength when the absorption is less than about 50% (e.g. <40%), more preferably less than 10%, and even more preferably less than about 1% per mm of material depth at this wavelength. This wavelength may be, for example, 1064 nm, 532 nm, 355 nm, or 266 nanometers. The average laser power measured at the material can be greater than 40 microJoules per mm thickness of material, for example between 40 microJoules/mm and 1000 microJoules, for example 100-900 µJ/mm, or between 100 and 650 microJoules/mm, with 200-400 µJ/mm being preferable.

Figure 8A:
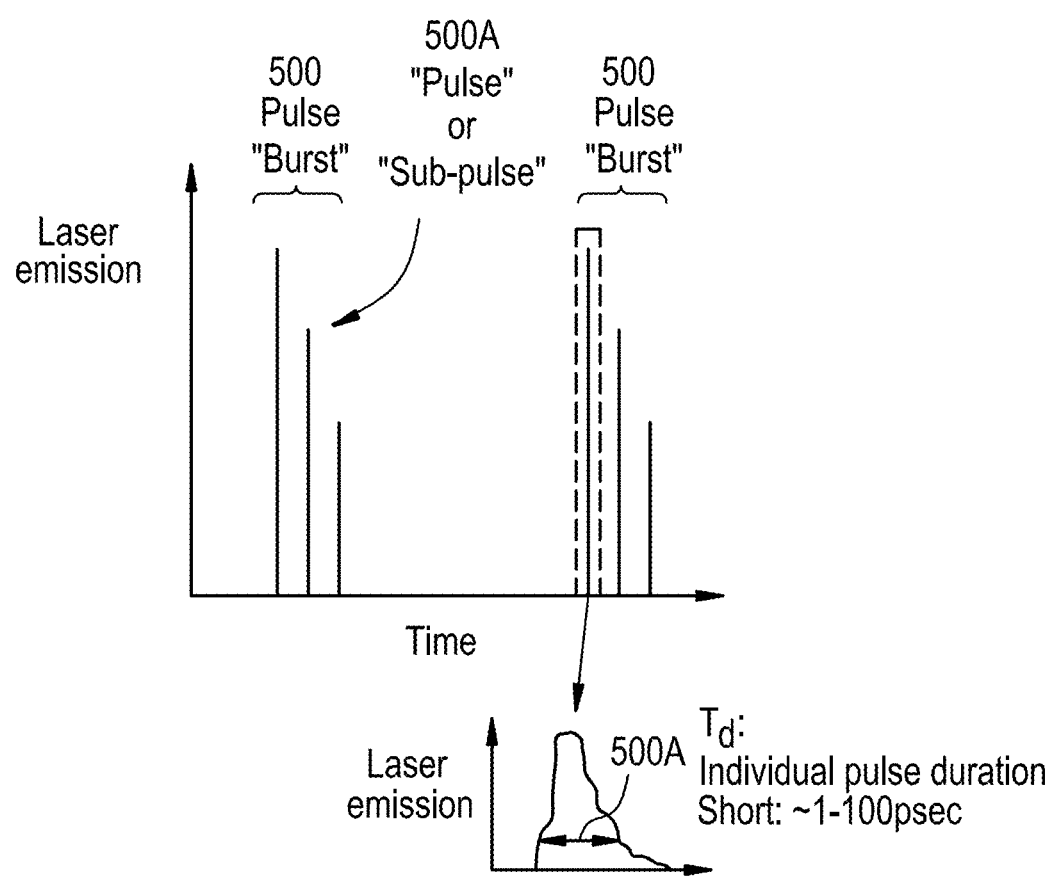
FIGS. 8A and 8B depict laser emission as a function of time for a picosecond laser. Each emission is characterized by a pulse "burst" which may contain one or more sub-pulses. Times corresponding to pulse duration, separation between pulses, and separation between bursts are illustrated.
Figure 8B:
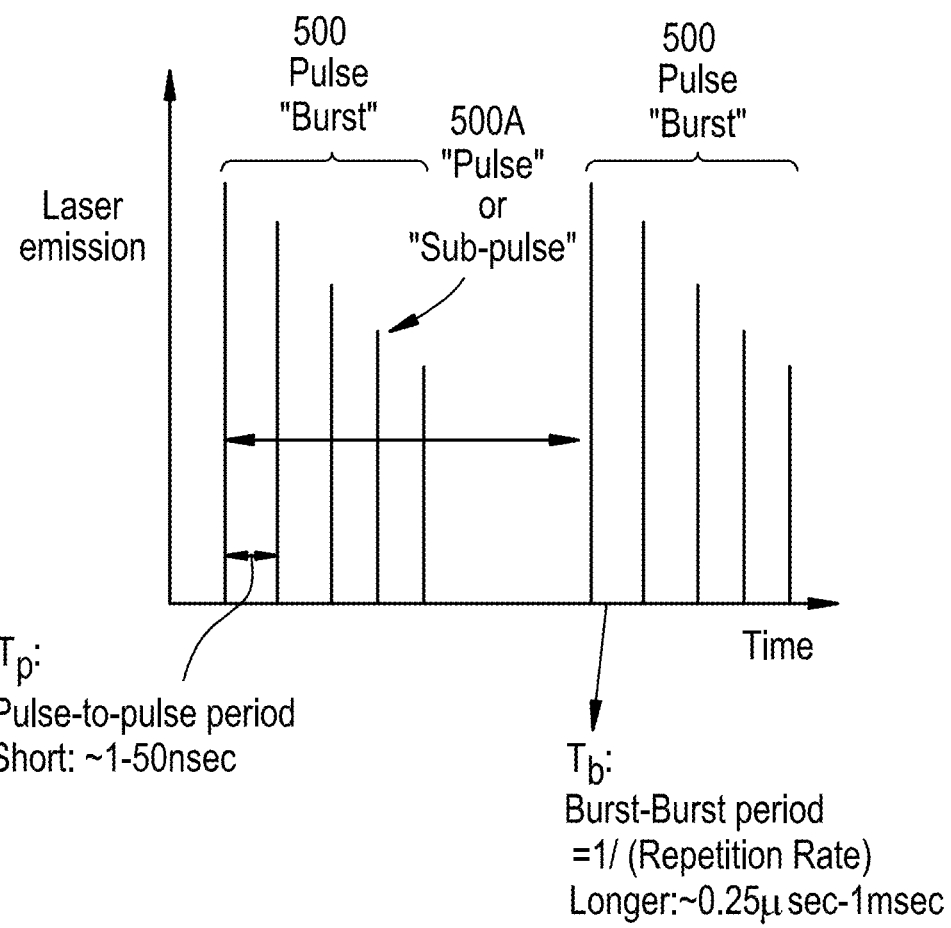

For example, as illustrated in FIGS. 8A and 8B, according to the embodiments described herein the picosecond laser creates a "burst" 500 of pulses 500A, sometimes also called a "burst pulse". Each "burst" 500 may contain multiple pulses 500A of very short duration $T_d$ up to 100 psec (for example, 0.1 psec, 5 psec, 10 psec, 15 psec, 18 ps, 20 ps, 22 ps, 25 ps, 30 ps, 50 ps, 75 ps, or therebetween). These individual pulses 500A within a single burst 500 can also be termed "sub-pulses," which simply denotes the fact that they occur within a single burst of pulses. The energy or intensity of each laser pulse 500A within the burst may not be equal to that of other pulses within the bust, and the intensity distribution of the multiple pulses within a burst 500 often follows an exponential decay in time governed by the laser design. Preferably, each pulse 500A within the burst 500 of the exemplary embodiments described herein are separated in time from the subsequent pulse in the burst by a duration $T_p$ from 1 nsec to 50 nsec (e.g. 10-50 ns, or 10-30 nsec, with the time often governed by the laser cavity design. For a given laser, the time separation $T_p$ between each pulses (pulse-to-pulse separation) within a burst 500 is relatively uniform (±10%). For example, in some embodiments, each pulse is separated in time from the subsequent pulse by approximately 20 nsec (50 MHz). For example, for a laser that produces pulse separation $T_p$ of about 20 nsec, the pulse to pulse separation $T_p$ within a burst is maintained within about ±10%, or is about ±2 nsec. The time between each "burst" (i.e., time separation $T_b$ between bursts) will be much longer (e.g., $0.25 \leq T_b \leq 1000$ microseconds, for example 1-10 microseconds, or 3-8 microseconds,). For example in some of the exemplary embodiments of the laser described herein it is around 5 microseconds for a laser repetition rate or frequency of about 200 kHz. The laser repetition rate is also referred to as burst repetition frequency herein, and is defined as the time between the first pulse in a burst to the first pulse in the subsequent burst. In other embodiments, the burst repetition frequency is in a range of between about 1 kHz and about 4 MHz. More preferably, the laser repetition rates can be, for example, in a range of between about 10 kHz and 650 kHz. The time $T_b$ between the first pulse in each burst to the first pulse in the subsequent burst may be 0.25 microsecond (4 MHz repetition rate) to 1000 microseconds (1 kHz repetition rate), for example 0.5 microseconds (2 MHz repetition rate) to 40 microseconds (25 kHz repetition rate), or 2 microseconds (500 kHz repetition rate) to 20 microseconds (50 kHz repetition rate). The exact timings, pulse durations, and repetition rates can vary depending on the laser design, but short pulses ($T_d$<20 psec and preferably $T_d \leq 15$ psec) of high intensity have been shown to work particularly well.

The required energy to modify the material can be described in terms of the burst energy—the energy contained within a burst (each burst 500 contains a series of pulses 500A), or in terms of the energy contained within a single laser pulse (many of which may comprise a burst). For these applications, the energy per burst can be from 25-750 µJ, more preferably 50-500 µJ, 50-250 µu. In some embodiments the energy per burst is 100-250 µJ. The energy of an individual pulse within the burst will be less, and the exact individual laser pulse energy will depend on the number of pulses 500A within the burst 500 and the rate of decay (e.g., exponential decay rate) of the laser pulses with time as shown in FIGS. 8A and 8B. For example, for a constant energy/burst, if a burst pulse contains 10 individual laser pulses 500A, then each individual laser pulse 500A will contain less energy than if the same burst pulse 500 had only 2 individual laser pulses.

The use of a laser capable of generating such burst pulses is advantageous for cutting or modifying transparent materials, for example glass. In contrast with the use of single pulses spaced apart in time by the repetition rate of the laser, the use of a burst pulse sequence that spreads the laser energy over a rapid sequence of sub-pulses (that comprise a burst 500) allows access to larger timescales of high intensity interaction with the material than is possible with single-pulse lasers. While a single-pulse can be expanded in time, as this is done the intensity within the pulse must drop as roughly one over the pulse width. Hence if a 10 psec single pulse is expanded to a 10 nsec pulse, the intensity drops by roughly three orders of magnitude. Such a reduction can reduce the optical intensity to the point where non-linear absorption is no longer significant, and light material interaction is no longer strong enough to allow for cutting. In contrast, with a burst pulse laser, the intensity during each sub-pulse 500A (or a pulse within 500A the burst 500) can remain very high—for example three 10 psec pulses 500A spaced apart in time by approximately 10 nsec still allows the intensity within each pulse to be approximately three times higher than that of a single 10 psec pulse, while the laser is allowed to interact with the material over a timescale that is now three orders of magnitude larger. This adjustment of multiple pulses 500A within a burst thus allows manipulation of time-scale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of microcracks. The required amount of burst energy to modify the material will depend on the substrate material composition and the length of the line focus used to interact with the substrate. The longer the interaction region, the more the energy is spread out, and the higher the burst energy that will be required.

Hole or Damage Track Formation:

If the substrate or transparent material has sufficient stress (e.g. with post-ion exchanged glass), then the part will spontaneously crack and separate along the path of perforated damage traced out by the laser process. However, if there is not a lot of stress inherent to the substrate (for example, as is the case of Corning Eagle XG® compositions), then the picosecond laser will simply form damage tracks (i.e., defect lines or perforations) in the piece. The defect lines or damage tracks usually have an interior diameter of not greater than 5 µm. That is, the defect lines (damage tracks) generally take the form of holes with interior dimensions of not greater than 5 microns, for example 0.5-1.5 microns, or 0.2 microns to 2 microns (for example, in some embodiments, 0.2 to 0.7 microns, or 0.3 to 0.6 microns). Preferably the holes are very small (single microns or less) in dimension.

The holes or defect lines can perforate the entire thickness of the material, and may or may not be a continuous opening throughout the depth of the material. FIG. 1C shows an example of such tracks perforating the entire thickness of a piece of 700 µm thick unstrengthened Gorilla® Glass substrate. The perforations or damage tracks are observed through the side of a cleaved edge. The tracks through the material are not necessarily through holes—there are often regions of glass that plug the holes, but they are generally small in size.

The lateral spacing (pitch) between these holes is determined by the pulse rate of the laser as the substrate is translated underneath the focused laser beam. Only a single picosecond laser pulse burst is necessary to form an entire hole, although multiple pulses may be used if desired. To form holes at different pitches, the laser can be triggered to fire at longer or shorter intervals. For cutting operations, the laser triggering generally is synchronized with the stage driven motion of the part beneath the beam, so laser pulses are triggered at a fixed interval, such as every 1 µm, or every 5 µm. The exact spacing is determined by the material properties that facilitate crack propagation from perforated hole to perforated hole, given the stress level in the substrate. However, in contrast to cutting a substrate, it is also possible to use the same method to only perforate the material. In this case, the holes are separated, for example, with a 5 µm pitch.

The laser power and lens focal length (which determines the filament length and hence power density) are particularly critical parameters to ensure full penetration of the glass and low micro-cracking.

In general, the higher the available laser power, the faster the material can be cut with the above process. Processes disclosed herein can cut glass at a cutting speed of 0.25 m/sec, or faster. A cut speed (or cutting speed) is the rate the laser beam moves relative to the surface of the transparent material (e.g., glass) while creating multiple holes or modified regions.) High cut speeds, such as, for example 250 mm/sec 400 mm/sec, 500 mm/sec, 750 mm/sec, 1 m/sec, 1.2 m/sec, 1.5 m/sec, or 2 m/sec, or even 3.4 m/sec to 4 m/sec are often desired in order to minimize capital investment for manufacturing, and to optimize equipment utilization rate. The laser power is equal to the burst energy multiplied by the burst repetition frequency (rate) of the laser. In general, to cut such glass materials at high cutting speeds, the damage tracks are typically spaced apart by 1-25 microns, in some embodiments the spacing is preferably 3 microns or larger—for example 3-12 microns, or for example 5-10 microns.

For example, to achieve a linear cutting speed of 300 mm/sec, 3 micron hole pitch corresponds to a pulse burst laser with at least 100 kHz burst repetition rate. For a 600 mm/sec cutting speed, a 3 micron pitch corresponds to a burst-pulsed laser with at least 200 kHz burst repetition rate. A pulse burst laser that produces at least 40 µJ/burst at 200 kHz, and cuts at a 600 mm/s cutting speed needs to have laser power of at least 8 Watts. Higher cut speeds therefore require even higher laser powers.

For example a 0.4 m/sec cut speed at 3 µm pitch and 40 µJ/burst would require at least a 5 Watt laser, a 0.5 m/sec cut speed at 3 µm pitch and 40 µJ/burst would require at least a 6 Watt laser. Thus, preferably the laser power of the pulse burst is 6 watts or higher, more preferably at least 8 Watts or higher, and even more preferably at least 10 W or higher. For example in order to achieve a 0.4 m/sec cut speed at 4 µm pitch (defect lines pacing, or between damage tracks spacing) and 100 µJ/burst one would require at least a 10 Watt laser, and to achieve a 0.5 m/sec cut speed at 4 µm pitch and 100 µJ/burst one would require at least a 12 Watt laser. For example, to achieve a cut speed of 1 m/sec at 3 µm pitch and 40 µJ/burst one would require at least a 13 Watt laser. Also for example 1 m/sec cut speed at 4 µm pitch and 400 µJ/burst would require at least a 100 Watt laser. The optimal pitch between damage tracks and the exact burst energy is material dependent, and can be determined empirically. However, it should be noted that raising the laser pulse energy or making the damage tracks at a closer pitch are not conditions that always make the substrate material separate better or with improved edge quality. Too dense a pitch (for example <0.1 micron, in some exemplary embodiments <1 µm, or in some embodiments <2 µm) between damage tracks can sometimes inhibit the formation of nearby subsequent damage tracks, and often can inhibit the separation of the material around the perforated contour, and may also result in increased unwanted micro cracking within the glass. Too long a pitch (>50 µm, and in some glasses >25 µm or even >20 µm) may result in "uncontrolled microcracking"—i.e., where instead of propagating from hole to hole the microcracks propagate along a different path, and cause the glass to crack in a different (undesirable) direction. This may ultimately lower the strength of the separated glass part, since the residual microcracks will acts as flaws which weaken the glass. Too high a burst energy (e.g., >2500 µJ/burst, and in some embodiments >500 µJ/burst) used to form each damage track can cause "healing" or re-melting of already formed microcracks of adjacent damage tracks, which will inhibit separation of the glass. Accordingly, it is preferred that burst energy be <2500 µJ/burst, for example, ≤500 µJ/burst. Also, using a burst energy that is too high can cause formation of microcracks that are extremely large and create flaws which reduce the edge strength of the parts after separation. Too low a burst energy (<40 µJ/burst) may result in no appreciable damage track formed within the glass, and hence very high separation strength or complete inability to separate along the perforated contour.

Typical exemplary cutting rates (speeds) enabled by this process are, for example, 0.25 msec and higher. In some embodiments the cutting rates are at least 300 mm/sec. In some embodiments described herein the cutting rates are at least 400 mm/sec, for example 500 mm/sec to 2000 mm/sec, or higher. In some embodiments the picosecond (ps) laser utilizes pulse bursts to produce defect lines with periodicity between 0.5 microns and 13 microns, e.g. 0.5 and 3 microns. In some embodiments the pulsed laser has laser power of 10 W-100 W and the material and/or the laser beam are translated relative to one another at a rate of at least 0.25 msec, for example at the rate of 0.25 to 0.35 msec, or 0.4 msec to 5 msec. Preferably, each pulse burst of the pulsed laser beam has an average laser energy measured at the workpiece greater than 40 microJoules per burst mm thickness of workpiece. Preferably, each pulse burst of the pulsed laser beam has an average laser energy measured at the workpiece greater of less than 2500 microJoules per burst per mm thickness of workpiece, and preferably lass than about 2000 microJoules per burst per mm, and in some embodiments less than 1500 microJoules per burst per mm thickness of workpiece, for example not more than 500 microJoules per burst per mm thickness of workpiece.

It has been discovered that much higher (5 to 10 times higher) volumetric pulse energy density ($\mu j/\mu m^3$) is required for perforating alkaline earth boro-aluminosilicate glasses with low or no alkali containing glasses as compared to that for glasses such as Corning Gorilla®. This can be achieved, for example, by utilizing pulse burst lasers, preferably with at least 2 pulses per burst and providing volumetric energy densities within the alkaline earth boro-aluminosilicate glasses (with low or no alkali) of about 0.05 $\mu J/\mu m^3$ or higher, e.g., at least 0.1 $\mu J/\mu m^3$, for example 0.1-0.5 $\mu J/\mu m^3$.

Accordingly, it is preferable that the laser produces pulse bursts with at least 2 pulses per burst. For example, in some embodiments the pulsed laser has laser power of 10 W-150 W (e.g., 10-100 W) and produces pulse bursts with at least 2 pulses per burst (e.g., 2-25 pulses per burst). In some embodiments the pulsed laser has the power of 25 W-60 W, and produces pulse bursts with at least 2-25 pulses per burst, and periodicity or distance between the adjacent defect lines produced by the laser bursts is 2-10 microns. In some embodiments the pulsed laser has laser power of 10 W-100 W, produces pulse bursts with at least 2 pulses per burst, and the workpiece and the laser beam are translated relative to one another at a rate of at least 0.25 m/sec. In some embodiments the workpiece and/or the laser beam are translated relative to one another at a rate of at least 0.4 m/sec.

For example, for cutting 0.7 mm thick non-ion exchanged Corning code 2319 or code 2320 Gorilla glass, it is observed that pitches of 3-7 microns can work well, with pulse burst energies of about 150-250 µJ/burst, and burst pulse numbers that range from 2-15, and preferably with pitches of 3-5 microns and burst pulse numbers (number of pulses per burst) of 2-5.

At 1 m/sec cut speeds, the cutting of thick Eagle XG® glass typically requires utilization of laser powers of 15-84 Watts, with 30-45 Watts often being sufficient. In general, across a variety of glass and other transparent materials, applicants discovered that laser powers between 10 and 100 W are preferred to achieve cutting speeds from 0.2-1 m/sec, with laser powers of 25-60 Watts being sufficient (and optimum) for many glasses. For cutting speeds of 0.4 m to 5 m/sec, laser powers should preferably be 10 W-150 W, with burst energy of 40-750 µJ/burst, 2-25 bursts per pulse (depending on the material that is cut), and hole separation (or pitch) of 3 to 15 µm, or 3-10 µm. The use of picosecond pulse burst lasers would be preferable for these cutting speeds because they generate high power and the required number of pulses per burst. Thus, according to some exemplary embodiments, the pulsed laser produces 10-100 W of power, for example 25 W to 60 Watts, and produces pulse bursts at least 2-25 pulses per burst and the distance between the defect lines is 2-15 microns; and the laser beam and/or workpiece are translated relative to one another at a rate of at least 0.25 m/sec, in some embodiments at least 0.4 m/sec, for example 0.5 m/sec to 5 m/sec, or faster.

Cutting and Separating Chamfered Edges:

Chamfer Method 1:

Different conditions were found that allow the separation of chamfered edges using unstrengthened Gorilla® Glass, specifically Corning code 2320. The first method is to use the picosecond laser only to create defect lines and forming a fault line following the desired shape (in this case a chamfered edge). After this step, mechanical separation can be accomplished by using a breaking plier, manually bending the part, or any method that creates tension that initiates and propagates the separation along the fault line. To create chamfered edges with defect lines in 700 µm thick unstrengthened Gorilla® Glass and mechanically separate the parts, the best results were found for the following optics and laser parameters: Picosecond laser (1064 nm)

Input beam diameter to axicon lens ~2 mm
Axicon angle=10 degrees
Initial collimating lens focal length=125 mm
Final objective lens focal length=40 mm
Focus set to be at z=0.7 mm (i.e. line focus set to be centered with regard to the glass thickness)
Laser power at 100% of full power (~40 Watts)
Pulse repetition rate of the laser=200 kHz.
Pitch=5 µm
3 pulses/burst
Single pass per filament line Sacrificial Edges:

The presence of the remaining defect line inside the glass can be beneficial to arrest the propagation of cracks when the edge is impacted. In this case the defect line planes can be used to serve as damage arrest locations, in effect creating a "sacrificial" edge part of the region of glass that is on the outside relative to the defect lines. In fact, creation of sacrificial edges that simply have an extra defect line to the interior of the separated edge, or a set of defect lines that intersect to form a more complex interior bevel inside of the true edge, may be a method of creating increased part reliability without the need for any physical chamfer feature on the outside edge of the part, nor any mechanical grinding and polishing to create that feature. Some options for this type of sacrificial edge are shown in FIG. 9. Since the picosecond laser process described above creates each defect line in a single pass and at speeds of up to 1 m/s, it is very easy and cost-effective to create these extra "damage stop" lines.

Chamfer Method 2:

Exemplary Formation of Defect Lines:

To create chamfered edges with defect lines in 700 µm thick unstrengthened Gorilla® Glass and mechanically separate the parts, according to one embodiment we utilized the following optics and laser parameters: Picosecond laser (1064 nm)

Input beam diameter to axicon lens ~2 mm
Axicon angle=10 degrees
Initial collimating lens focal length=125 mm
Final objective lens focal length=40 mm
Focus set to be at z=0.7 mm (i.e. line focus set to be centered with regard to the glass thickness)
Laser power at 100% of full power (~40 Watts)
Pulse repetition rate of the laser=200 k Hz.
Pitch=5 µm
3 pulses/burst
Single pass per filament line The laser, for example the picosecond laser described above creates the fault line and cuts the glass. The separation of the outside glass edge pieces formed by the defect lines need not be done by a mechanical force. Laser processing itself can create enough stress to pop the small chamfer regions or corner pieces off of the part. This laser cutting process utilizes a line focus and can cut glass or other transparent materials at speeds of 200-1000 mm/sec, either normal or at an angle to create a chamfer shaped edge. According to some the embodiments described herein, during the cutting process the intense laser beam(s) cuts and separates the thin glass, causing less than 60 µm of subsurface damage with a less than 400 nm Ra surface roughness. According to some embodiments sub-surface damage is less than 30 µm with less than 200 nm Ra surface roughness. The laser glass cutting is accomplished to within microns of the final product shape, now allowing the final finishing process to remove only minimal glass stock material to meet customer edge finish, strength and edge impact requirements. This process can cut stacks of glass normal to the glass surface allowing stack finishing to occur.

Separation of the outside glass edge pieces formed by the defect lines need not be done by application of the $CO_2$ laser or application of mechanical force. In many instances, the glass part separated from a glass substrate is sent for chemical strengthening in an ion exchange process. Ion exchange itself can create enough stress to prompt peeling or separation at the chamfer regions or corners of the part. The introduction of new ions into the glass surface can create enough stress to cause the outside corner pieces to peel or separate. In addition, the high temperature salt bath used in the ion exchange process can provide thermal stress sufficient to induce peeling or separation along the fault line to provide a chamfered or otherwise shaped edge. In either case, the ultimate result is an edge that more closely follows the interior defect lines to form the desired chamfer shape see FIG. 10A-10C). FIG. 10A is an illustration of a cut part with internal defect lines being placed into ion-exchange, which adds enough stress to remove the perforated edges and form the desired edge chamfer. FIG. 10B an illustration of a cut part with internal defect lines being placed into ion-exchange (IOX) to release chamfered corners, similar to the illustration shown in FIG. 10A, but with only two defect line planes. FIG. 10C is an illustration of a chamfer with many angles (more than 3 defect line planes).

The laser cut edge may be edge finished to remove damage remaining on the edges in the areas exposed to laser cutting and separation. According to at least some embodiments, the edge strength of substrates prepared by laser cutting may be increased considerably through the use of a significantly compliant abrasive edge finishing wheel (also referred herein as a polishing wheel) during edge finishing. The use of the compliant (bulk modulus of elasticity of 0.1 GPa to 5 GPa) abrasive polishing wheel effects material removal in the partial ductile regime (concentrating, for example, such removal on the corners formed by the parallel substrate surfaces and the substrate edge of the workpiece). In so doing, edge strength and impact damage resistance are increased not only by reducing subsurface damage through partial ductile regime material removal (as determined by fracture mechanics in partial ductile regime edge finishing) but also by neutralizing stress concentration points (i.e., corners formed between parallel substrate surfaces and the substrate edge) by rounding them off. In some embodiments the polishing wheel is a compliant fixed abrasive edge finishing wheel (the abrasive is potted in, and does not move). In some embodiments the polishing wheel is a compliant abrasive edge finishing wheel where the abrasive is externally delivered and is not fixed, but the polishing wheel provides abrasive edge finishing by carrying the abrasive. In these embodiments the polishing wheel body is still compliant with the bulk modulus of elasticity of 0.1 GPa to 5 GPa. In some embodiments the polishing wheel is a compliant fixed abrasive edge finishing wheel and the additional abrasive is externally delivered, providing abrasive edge finishing by carrying the abrasive. The polishing wheel body in such embodiments is still compliant with the bulk modulus of elasticity of 0.1 GPa to 5 GPa.

Thus, according to one embodiment, the method utilizes a constant force edge finishing process employing a compliant fixed abrasive wheel 100 (also referred to as a polishing wheel, or finishing wheel 100 herein) made compliant by virtue of a construction featuring a soft (not metal or ceramic) abradable bonding material bearing a quantity of abrasive of a particular type, size, concentration, and friability to provide the desired edge finishing. The bonding material may be, for example, a polymeric material. The compliant, fixed abrasive wheel(s) 100 is(are) affixed to an apparatus capable of rotating the wheel(s) at high speeds and simultaneously bringing it(them) into contact with the substrate edge(s) intended for finishing. Lateral force is applied by the apparatus housing the wheel 100 such that the glass substrate (workpiece's) edge(s) is(are) completely imposed into the compliant wheel thereby enabling stress concentration points on the substrate edge profile(s) formed by advanced cutting technologies to be rounded and neutralized. Truing and dressing of the compliant wheel 100 are carried out as a matter of course.

Figure 11A:
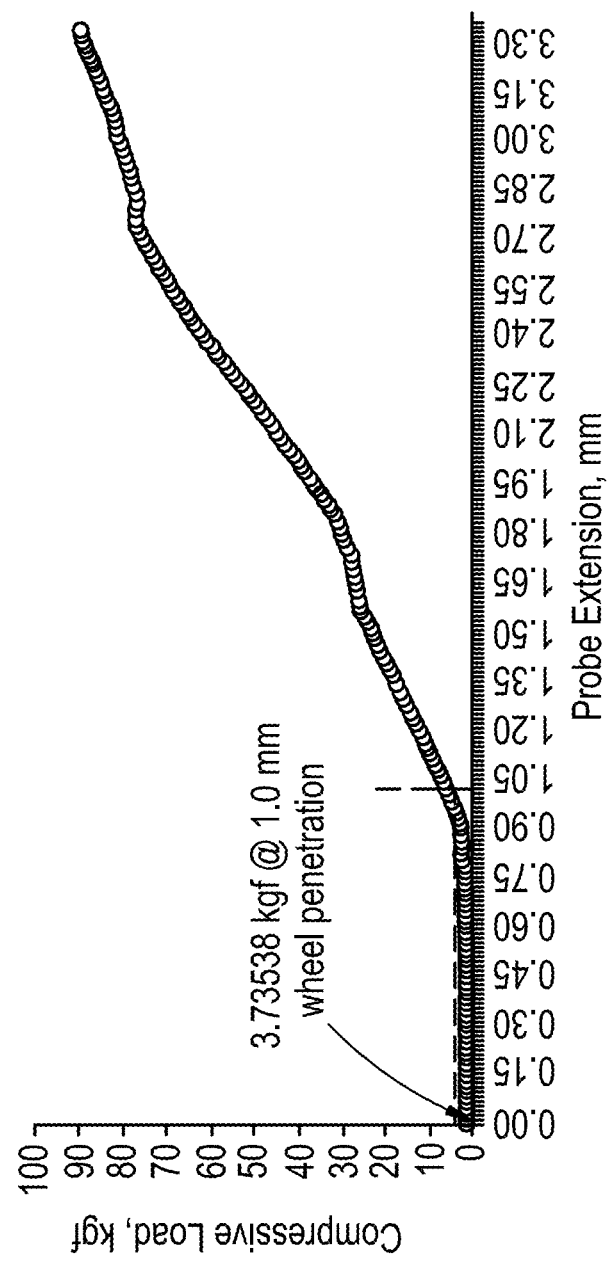
FIG. 11A provides a plot summarizing a INSTRON compression test results performed on the radial edge of one embodiment compliant edge finishing wheel (polishing wheel) using the edge probe.
Figure 11B:
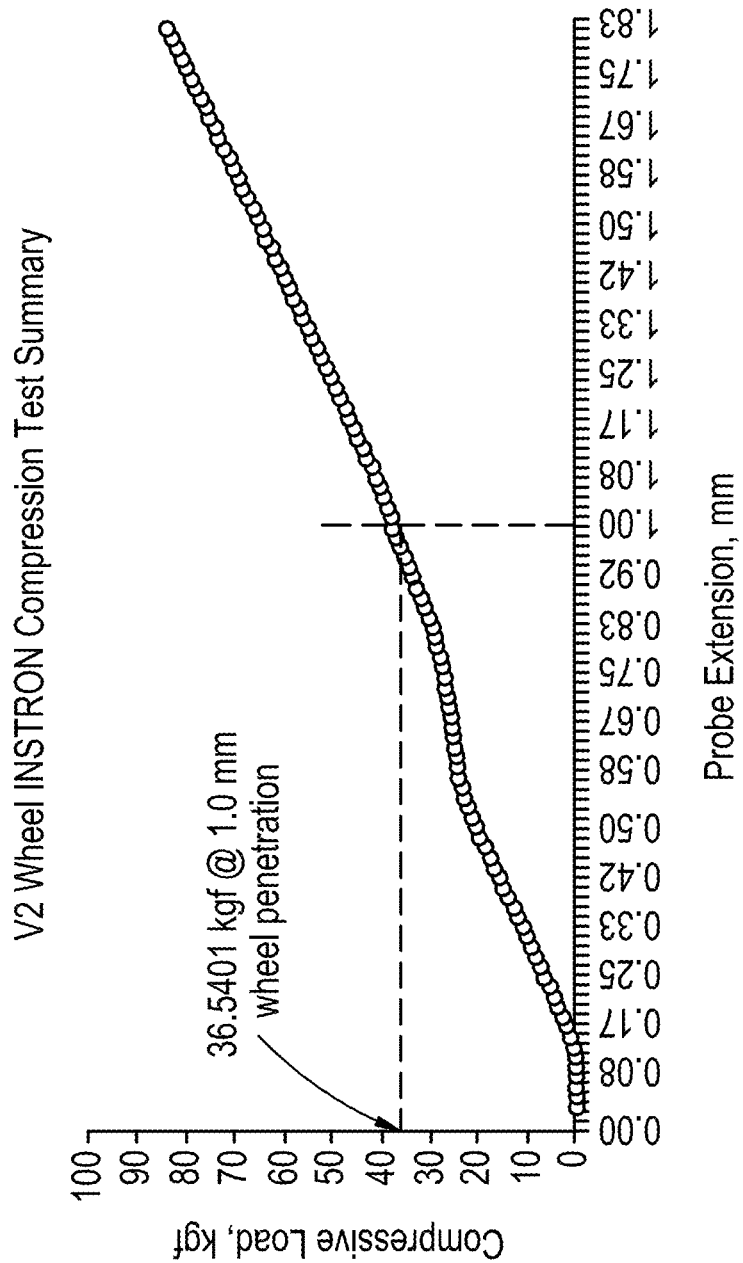
FIG. 11B provides a plot summarizing a INSTRON compression test results performed on the radial edge of a comparative stiff abradable finishing wheel using the same edge probe.
Figure 12A:
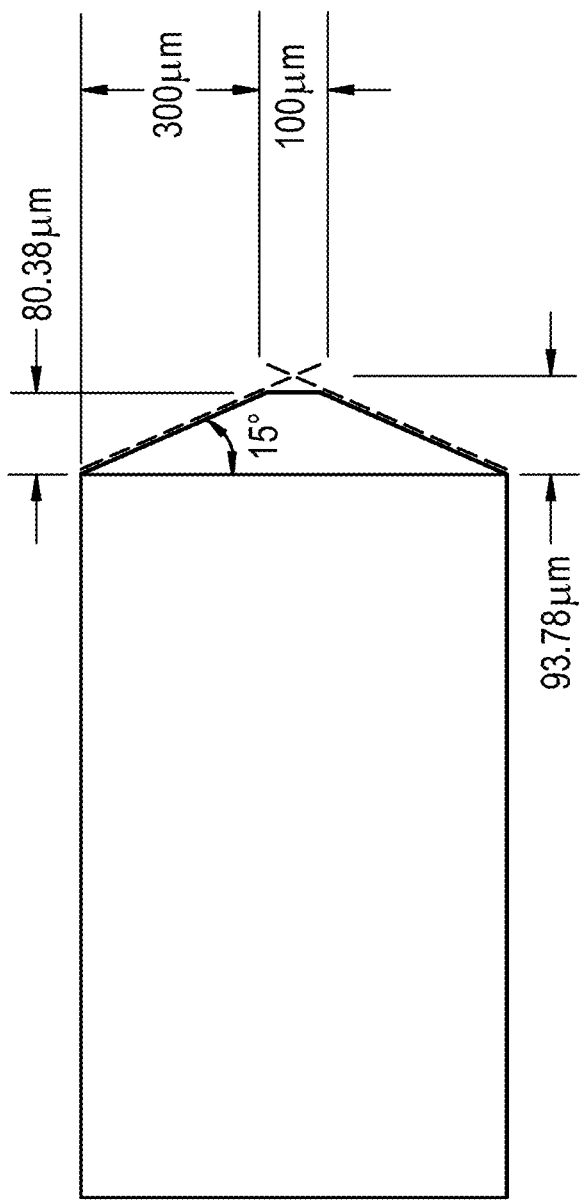
FIG. 12A is a schematic diagram of the edge profile obtained when parts are laser cut with a 15° extended edge chamfer.
Figure 12B:
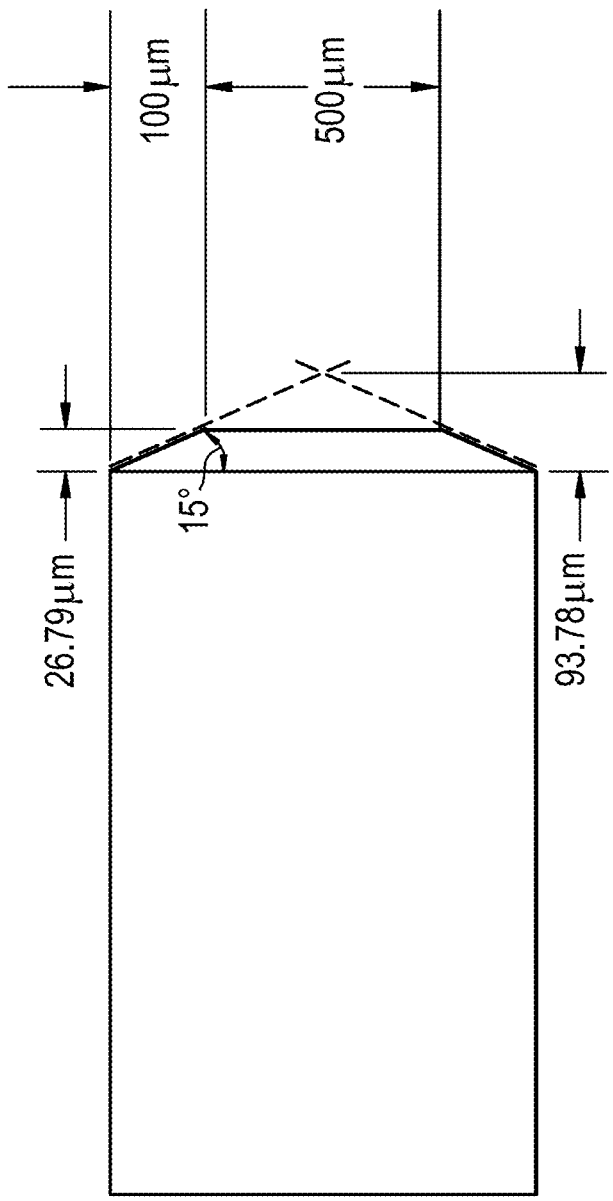
FIG. 12B is a schematic diagram of the edge profile obtained when parts are laser cut with a 15° shortened edge chamfer.
Figure 12D:
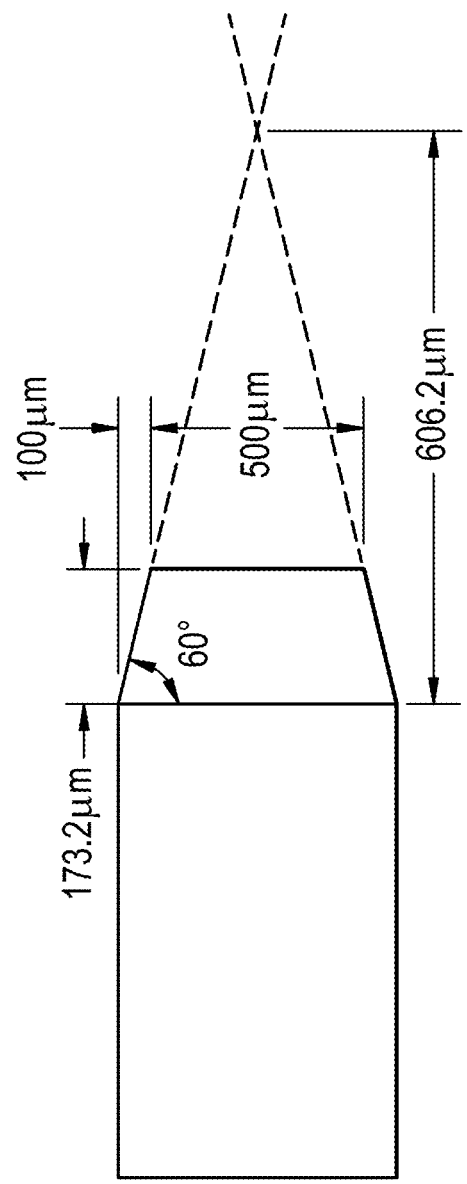
FIG. 12D displays a schematic diagram of the edge profile obtained when parts are laser cut with a 60° edge chamfer.
Figure 13A:
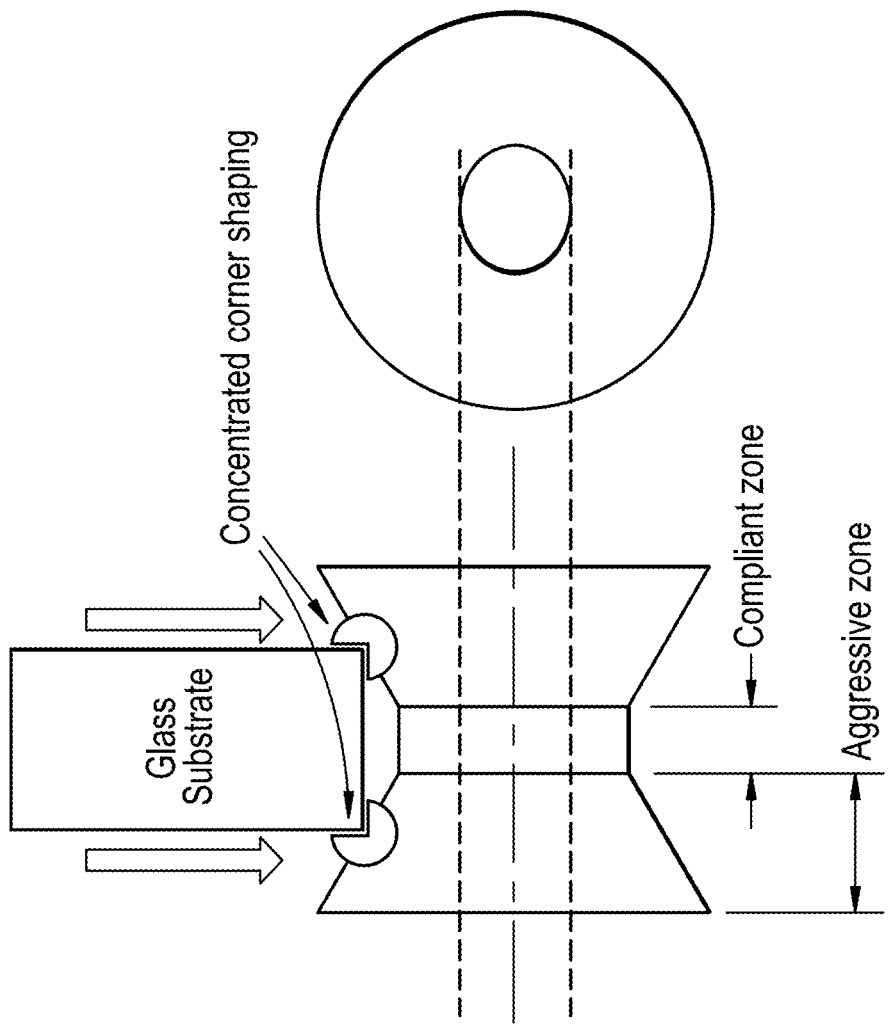
FIG. 13A represents a composite fixed abrasive wheel, illustrating how wheel design utilizing different bonding materials, abrasives, and form factors may be used to concentrate finishing action to suit the incoming edge profile.

More specifically as referred to herein, compliance refers to the relative mechanical resistance of the fixed finishing wheel to lateral force such as that delivered by an external source such as an air cylinder, simple spring, or other such device and transmitted through a defined contact area such as a representative substrate edge as occurs in the course of edge finishing. In one exemplary embodiment compliance was quantified employing a commercially available Instron (model number 5500R) testing system set up to deliver compressive force to the fixed finishing wheel structure through a test probe designed to replicate a typical rectangular substrate edge. The wheel is mounted vertically and the probe brought to its surface at its outside diameter thereby enabling compressive force to be applied to the wheel radially. A compliant abrasive wheel 100 offers relatively low initial resistance to the compressive force transmitted radially through the edge probe in such testing thereby enabling considerable penetration of the substrate edge into the fixed wheel material. According to some the embodiments described herein the polishing wheel is compliant—i.e., it has a bulk modulus of elasticity of 0.1 GPa to 5 GPa (e.g., 1 to 4 GPa, or 2 to 4 GPa). According to some the embodiments described herein the polishing wheel is compliant, such that at a probe extension (effectively equivalent to the penetration into the wheel) of 1 millimeter the resistance offered by the compliant wheel is not greater than 10 $kg_f$, e.g., 0.1 $kg_f$ to 6 $kg_f$ (dry, without application of lubricant). For example, in FIG. 11A it can be seen that at a probe extension (effectively equivalent to the penetration into the wheel) of 1 millimeter the resistance offered by the compliant wheel is 3.73 $kg_f$. From FIG. 11B, however, it can be seen that the same probe extension in a non-compliant (but readily abraded) conventional vitreous (V2 style) polishing wheel produces a resistance exceeding 36 $kg_f$—nearly 10 times that of the embodiment of the compliant wheel 100 corresponding to FIG. 11A, and such non-compliant wheel would have to be applied to the cut edge with 10 times the amount of force, and such large force can result in damage to the substrate, subsurface crack propagation and excessive wheel wear. The compliant wheel 100 utilized in this embodiment comprised synthetic diamond but other abrasive materials types such as cerium oxide, zirconium oxide, silicon carbide, etc may also be employed. Abrasive particle size in the fixed abrasive wheel 100 used in this embodiment was determined by optical microscopy to be 5-10 µm and was present in a 2.5-5% concentration by volume. Edge finishing using this methodology was not limited, however, to these abrasive sizes and concentration ranges. Abrasive particle size ranging from 0.1 to 100 µm in concentrations ranging from 2.5 to 50% volume concentration in a wide range of abrasive friability (relative toughness) can also be employed. Furthermore, in this exemplary embodiment abrasive toughness of the abrasives is considered to be in the upper range of toughness (less friable); it would be considered in the MBG 620-MBG 660 range on the ranking scale. However, abrasives with friability ranging from MBG 600 to MBG 680 may be used in the fixed compliant wheel setup comprising this edge finishing embodiment, compliant abrasive wheel 100 may utilize (or be made of) a large range of abrasive materials (i.e., natural diamond, synthetic diamond, zirconium, cerium oxide, silicon carbide, and many others). As mentioned above, the compliant, fixed abrasive wheel(s) 100 is(are) affixed to an apparatus capable of rotating the wheel(s) at high speeds and simultaneously bringing it(them) into contact with the substrate edge(s) intended for finishing. Wheel rotation speed is used to impart (as well as gauge) the rate of contact of abrasive wheel to substrate (or work piece) edge during edge finishing. While wheel speed is typically measured in revolutions per minute, the interaction of abrasive with substrate edge as expressed by the number of contacts that individual abrasive particles make with the substrates being finished is also important. This rate of contact is expressed as a linear rate such as surface feet (or meters) per minute. In this exemplary embodiment edge polishing of the workpiece was accomplished using 101.6 mm diameter compliant finishing wheels 100 rotated at wheel speeds ranging from 500 rpm to 6000 rpm, resulting in linear contact rates of 159.6 to 1915.2 smpm (surface meters per minute). Applicants believe that higher wheel speeds (and therefore linear surface contact rates), for example wheel speeds approaching about the 7000 rpm or 2234 smpm) are more effective in maximizing material removal and reducing substrate edge subsurface damage. In addition, maximum wheel operating speeds may be increased by providing mechanical support to the finishing wheels selected. For example, the compliant, abradable wheel comprising this embodiment possesses a maximum operating speed (MOS) of 7000 rpm when supplied in the 101.6 mm diameter size. However, if the inner diameter of this wheel is reinforced with a steel or ceramic press fit flange, for example, the MOS could be increased substantially (>8000 rpm). As described above, according to this embodiment, lateral force is applied by the apparatus housing the wheel 100 such that the substrate edge(s) is(are) completely imposed into the compliant wheel thereby enabling stress concentration points on the substrate edge profile(s) formed by advanced cutting technologies to be rounded and neutralized. In this embodiment the amount of lateral force was measured using a grinding system equipped with a high speed (10,000 rpm) air bearing spindle with capacitance gauges mounted in such a way that the spindle air gap could be measured and recorded during operation. Changes in the magnitude of the spindle air gap were assumed directly proportional to spindle deflection since the spindle bearings themselves are of exceedingly high stiffness and the magnitude of their deflection could therefore be neglected. Changes in the spindle air gap measured during operation, therefore, could be considered the result of lateral forces imparted by the leveraging of the substrate into the finishing wheel. With this apparatus and method, lateral forces could be measured over the range of edge finishing conditions of interest. In one exemplary embodiment the range of lateral force was measured to be 7.2-13.6 N, (workpiece dimensions were 44 mm×60 mm). However, greater lateral force can be utilized on larger workpieces. For example, a representative tablet sized part with 35.56 cm diagonal has more than 30 times the area in contact with its vacuum chuck than that of a typical 44 mm×60 mm sized sample part. More specifically, a considerably greater lateral force would be needed to dislodge the tablet sized part from its vacuum chuck; therefore, the larger part or workpiece could stand up to much greater lateral finishing force before being dislodged, damaged or broken during finishing. The amount of lateral force applied to the edge of the substrate in edge finishing must also be tuned to the geometry of the edge profile. For example, a square-edged profile or one chamfered with a small angle to the vertical (see FIGS. 12A-12B) does not require as much penetration into the compliant wheel during edge finishing to effectively round off the transitional corners (those formed at the flat surfaces of the substrate) as do those substrates bearing profiles with larger angles to the vertical (see FIGS. 12C-12D). It is important that all areas of stress concentration are effectively finished in order to achieve the objective of maximizing edge strength post chemical strengthening. If edge chamfer angle projections are made and the distances between their intersection and the plane formed by the transitional corners is calculated a good initial estimation of optimal wheel penetration during edge finishing can be made. As the chamfer angle with the vertical is increased, the projected immersion of part edge into wheel during finishing can be expected to increase. For example, when the chamfer angle is 15 degrees with the vertical (see FIG. 12B) the part edge is immersed into the wheel ~93.78 µm if rounding of transitional corners is to be effected at high speed. When the chamfer angle is 45 degrees with the vertical (see FIG. C) recommended part edge immersion into the wheel increases to 350 µm and at a chamfer angle of 60 degrees with the vertical (see FIG. 12D) recommended part immersion during edge finishing exceeds 600 µm by this method of estimation. Application of coolant to the finishing stage during edge finishing is preferably carried out using the multi-port coolant ring delivery system resident on the finishing platform used to execute edge finishing as prescribed. For example, in this embodiment, BlueKool coolant distributed by Universal Photonics Incorporated of Hicksville N.Y. was mixed (a 3% concentration of BlueKool coolant in clean potable water) and applied to the finishing stage through a multi-port coolant delivery ring assembly at a rate of 1-10 gallons per minute. A wide range of cutting fluids over a wide range of concentrations, however, may be employed for this purpose. Cutting fluids such as light machine oils, other synthetic coolants (e.g., Sabrelube manufactured by Oakite Chemetall of Berkley Hights, N.J.) and even clean water may also be used as coolants. Edge finishing in the manner prescribed in this embodiment may also be executed in the absence of any coolant at all; that is, dry edge polished using a compliant, abrasive wheel such as compliant wheel 100. Truing of the compliant wheel 100 can be carried out per common accepted practice in edge finishing. In this embodiment, the compliant wheel 100 was mounted on a carefully balanced spindle (balanced to within 5 microns) on an appropriate grinding platform and a carbide tool brought into contact with the wheel outside diameter with a controlled application of lateral force thereby preferentially abrading those parts of the wheel that were out of round until the finishing wheel under scrutiny was made concentric to the rotational axes of the grind spindle. In the second embodiment, the work piece after being cut or separated by the laser (as described above) is edge finished using a compliant, abradable fixed abrasive composite wheel 100', i.e., the wheel 100' may have a composite wheel structure having multiple abrasive layers, portions or parts. The number of abrasive parts (or layers, for example) used to construct such a wheel 100' would be determined by the resolution of edge finishing distribution desired by the end user. In each abrasive layer (or some of the layers) of such a composite wheel structure may be varied by abrasive properties (type, size, concentration, friability, bond, mixture), dimensional properties (thickness, diameter, shape), and physical properties (hardness, abradability, compliance) with gradients imposed on each property where applicable. Processing conditions of the part, and their associated ranges would apply as in the previous embodiment. However, in this embodiment, the benefits of partial ductile regime grinding using the compliant fixed abrasive wheel as described are increased. That is, the composite fixed abrasive wheel structure may be designed and fabricated in such a way as to distribute material removal and finishing action to different areas of the substrate being machined. For example, a fixed abrasive finishing wheel may be constructed bearing multiple layers each distinguished by abrasive type, abrasive size, abrasive friability, abrasive concentration, bond rigidity, and even diameter/form factor designed to distribute finishing action to different areas of a substrate edge to suit edge profile and geometry. For example, consider a substrate cut using a laser in such a way as to create a square edge profile; that is, one that has no chamfer or bevel but only an edge perpendicular to the parallel surfaces of the substrate. Consider that such a substrate bears a uniform amount of damage across the cut surface but that it is desired to concentrate material removal at the corners formed by the square cut edge and the parallel surfaces of the substrate so as to form a rounded edge profile. In the simplest case, this may be accomplished using a composite wheel consisting of three structures oriented and set rigidly into place as shown in FIG. 13A. FIG. 13A illustrates a composite fixed abrasive polishing wheel, and also illustrates how wheel design utilizes different bonding materials, abrasives, and form factors that are used to concentrate finishing action to suit the incoming edge profile.

More specifically, the three layer composite fixed abrasive polishing wheel shown in FIG. 13A is designed to concentrate finishing action at the corners where it is believed needed to produce the desired edge profile and maximize edge impact resistance as well as bend strength. The structure is symmetrical; that is, the layer labeled with "aggressive zone" is the same on each side of the composite structure and only the wheel core material is different.

Figure 13B:
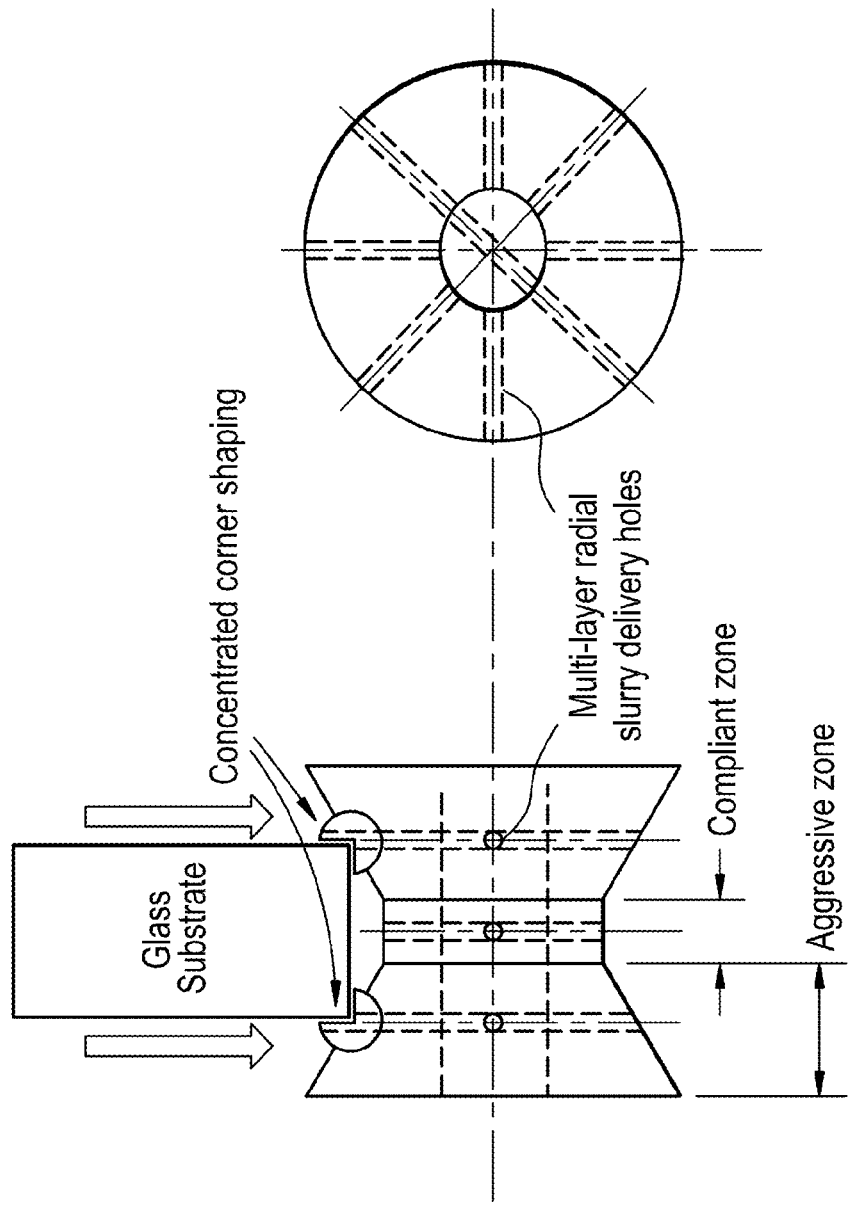
FIG. 13B illustrates the concept of a compliant polishing wheel with provisions made for delivery of abrasive slurry through the spindle and wheel during operation.

In a third embodiment the laser cut edge may be edge finished using a compliant, abradable wheel 100" with or without a fixed abrasive but with a quantity of loose abrasive delivered to the critical edge finishing interface at a suitable rate. The fixed wheel is compliant as described in the previous embodiment (i.e., compliant wheel 100) and may be laden with a quantity of abrasive in the same abrasive type, concentration, and friability as well. In this embodiment edge finishing is carried out utilizing a constant force edge finishing process employing a wheel 100" made compliant by virtue of a construction featuring a soft, abradable wheel body bearing a quantity of fixed abrasive (i.e., similar to the compliant wheel 100) but equipped with a means by which loose abrasive may be delivered to the interface between substrate and wheel during operation (see FIG. 13B). The loose abrasive may be in the form of a liquid suspension of small abrasive particles ranging in size from 10 nanometers to 100 microns delivered to the substrate-fixed wheel interface by means of a pump or any other like device. The loose abrasive may be very small in particle size with extremely high abrasive integrity and relative toughness (friability) as in the case of detonation nano-diamond powder or it may be much larger and considerably more friable as in the case of monocrystalline diamond powder or metal bond diamond powder. The loose abrasive may be diverted directly to the substrate-wheel interface in the form of a properly aimed concentrated stream or it may be delivered to the interface through the wheel core by means of a grinding spindle equipped with rotary union(s) and fluid channel(s) capable of accepting and distributing abrasive material in this form. The loose abrasive may be delivered in concentrated form or it may be suitably diluted to enable the needed contact of abrasive with substrate surface intended for finishing. The loose abrasive may also be supplied in such a way that it may be forced into the compliant wheel structure (i.e., by dead heading it) and allowed to bleed through the wheel structure aided by high speed revolution (500-10,000 rpm) to come into contact with the intended substrate surface. The loose abrasive may also be delivered to individual sections of a composite wheel structure to further enhance the distribution of edge finishing action. For example, if as shown in FIG. 13B the objective of edge treatment of substrates laser cut according to embodiments outlined in this application is to concentrate finishing action at the substrate corners, then a more aggressive loose abrasive (i.e., greater in abrasive size, concentration, and toughness) might be dispensed to the slurry paths located in the outer regions of the wheel cross section and a finer, less aggressive loose abrasive (i.e., smaller abrasive size, lower concentration, more friable) be diverted to the center of the composite structure core (see FIG. 13B). Any combination of fixed abrasive wheel composite structure dimensional, material, and physical properties and loose abrasive properties may be used to execute distributional partial ductile mode edge finishing in this manner.

Edge finishing process parameters and their associated operating ranges are the same in this embodiment as in the previous one and are summarized below accompanied by the exemplary ranges of operation:

Wheel speed 500-10,000 rpm—in some embodiments 500 to 8000 rpm, for example in one embodiment 6000 rpm (1915 smpm).

Wheel diameter 50.8-203.2 mm—for example in one embodiment 101.6 mm

Wheel preparation—Truing using high precision spindle and carbide tool

Abrasive Properties:
a) Abrasive size 0.1-100 µm, for example 5-10 µm
b) Abrasive friability—MBG 600-MBG 680, for example in some embodiments MBG 650-MBG 680 (e.g., MBG 660)
c) Abrasive concentration—2.5-50% volume, for example in some embodiments 2.5-5% volume
d) Abrasive type—not limited by type—but in some embodiments synthetic diamond Compliant wheel 100, 100', 100"

Feed rate (linear motion of the workpiece):2 mm/min-10,000 mm/min, for example 100-300 mm/min (e.g., in some exemplary embodiments 254 mm/min)

Exemplary coolant flow rate, if coolant is utilized,—1-10 gpm (gallons/min), for example ~5 gpm Exemplary coolant delivery method—for example: either high pressure directed, or controlled flood (e.g. via a nozzle)

Coolant composition—none, or water, or light oil, in some embodiments 3% BlueKool coolant in water Depth of cut (lateral force): 0.1 N-100 N, for example 10-20 N—e.g., 13.6 N.

This technique offers one or more of the following advantages:

1. the combination of precise laser cutting technology followed by mechanical processing with compliant edge finishing wheel 100, 100', or 100" and constant force polishing described eliminates the need for all edge grinding processing steps and most subsequent edge polishing steps, thereby reducing edge finishing processing to a single step and reducing corresponding cycle times and related expenses.
2. Constant force polishing as described enables superior polishing of substrate corners where rectangular substrates are processed; constant force polishing enables good contact of finishing wheel to substrate edge even at such transitional points such as corners thereby improving edge finishing consistency around the part perimeter,
3. Edge finishing following the laser cutting described herein does not require the use of expensive, mechanically stiff, highly precise grinding platforms, however existing coomercial grinding platforms may be used with wheel 100 to carry out this edge finishing.
4. Edge strengths exceeding 800 MPa following chemical strengthening after polishing (i.e., glass was ion exchanged after polishing with the wheel 100) have been demonstrated with application of this embodiment; specifically, points of stress concentration are removed even at those points at which the flat surface of the substrate transitions into the intended edge profile. For example, in one embodiment, 4-8 μm of material removal via edge finishing in the manner described herein resulted (after ion exchange) in a post-IOX B10 strength increase of 15% (from 659 MPa to 761 MPa B10) and an increase in the maximum edge strength post-IOX of 32% (from 720 MPa to 950 MPa).
5. Dimensional control is improved considerably with this method as parts are cut with high accuracy to near net shape; since edge finishing is only needed to round corners to remove stress concentration points removal is low, and there is little risk of significant dimensional changes.
6. Since edge finishing by the method of the embodiments described herein is performed in largely partial ductile mode finishing and not brittle fracture mode grinding, block chipping does not occur at the point on the substrate edge where the flat parallel surfaces (front and back) transition into the edge bevel shape.
7. Since edge finishing by the method of this embodiment is largely partial ductile mode finishing and not brittle fracture mode grinding, edge profile consistency is dictated by the more consistent and reliable laser cutting and chamfering method and not by edge finishing; poor alignment of substrate edge in grinding groove is much less of a concern as compared to conventional methods of edge finishing.

More specifically, following the cutting performed with the laser as described above, according to some embodiments the cut glass substrate (work piece) is mounted in place and is edge polished with a wheel 100, 100', 100". This embodiment enables edge polishing to be conducted at high speeds by implementing constant force polishing. The edge polishing step fully finishes the cut surface and in the present embodiments is performed without additional mechanical grinding or polishing steps (i.e., this process does not require: the use of multiple grinding and polishing wheels, and/or mechanical grinding followed by sequential polishing steps with several types of polishing wheels with different abrasive characteristics (from coarse to fine) to create the final polish).

Figure 15A:
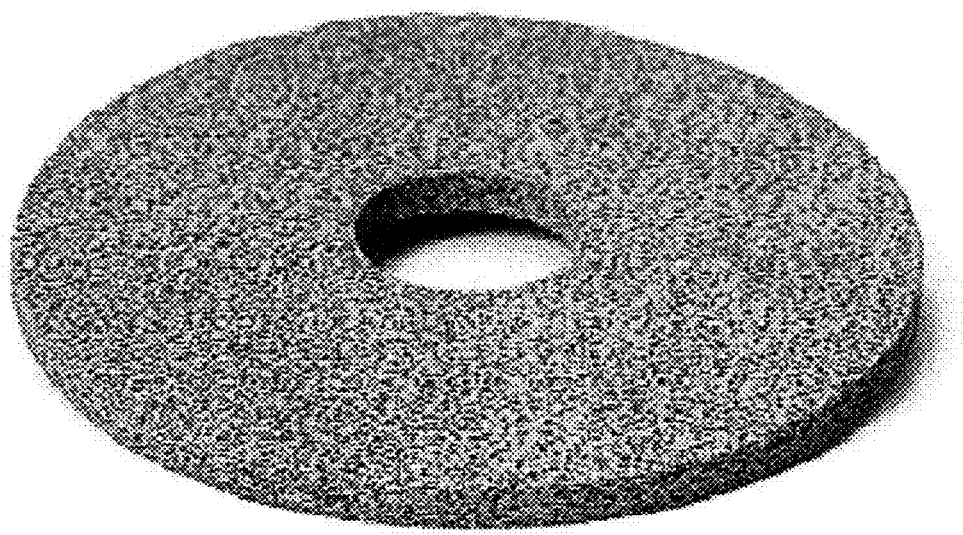
FIG. 15A illustrates one embodiment of a compliant wheel 100 utilized for mechanically processing laser cut glass.
Figure 15B:
FIGS. 15B-15E are microphotograps of the wheel of FIG. 15A.
Figure 15C:
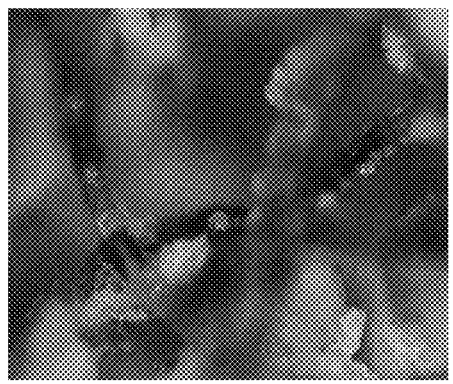
Figure 15D:
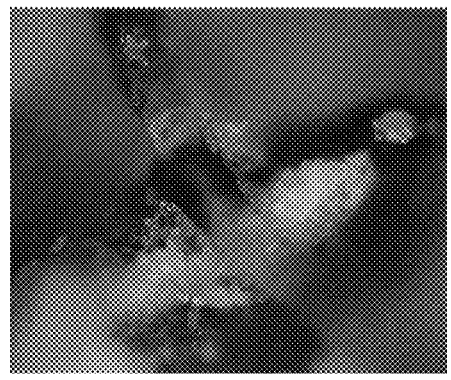
Figure 15E:
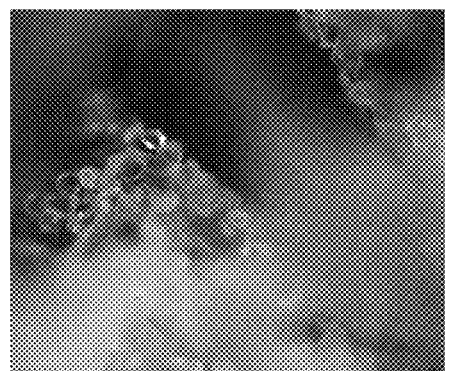

In the apparatus described herein, the glass substrate processed (by the laser system described above) is mounted on a chuck capable of rotation and the edge finishing wheel(s), where the spindle is affixed to nearly frictionless linear slides. Air cylinders are employed to drive the rotating finishing wheel into the edge of the glass substrate intended for polishing and to maintain a constant lateral force on the wheel. A large stroke capability is designed into the air cylinder; such a large stroke is able to compensate for all possible wheel wear thereby maintaining constant polishing force on the substrate edge. The glass substrate processed by the picosecond laser itself is caused to rotate on the chuck to which it is affixed via vacuum at a speed designed to match the intended linear edge finishing feed rate. In this manner, substrate edges are fed into constant force-fed polishing wheels and good contact is maintained between substrate edge and finishing wheel even at transition points such as corners. FIG. 14 illustrates schematically one embodiment of a constant force polishing apparatus that utilizes a compliant polishing wheel 100, 100', 100"). FIG. 15A illustrates one embodiment of a compliant wheel 100 utilized for mechanically processing laser cut glass that is utilize in the apparatus of FIG. 14.

In one embodiment of this invention Gorilla™ Glass substrates laser cut into near net shapes were edge finished using the method comprising this invention. Substrates were 2320 Gorilla™ Glass material of 0.70 mm thickness laser cut into a rectangular form factor using the laser processing method described above. The 1064 nm picosecond laser cutting system was operated at a cutting speed of 200 mm/sec when producing these glass substrates (samples).

In this embodiment the glass substrates were mounted on an aluminum vacuum chuck bearing a soft plastic cover to prevent damage to the substrate surface during edge treatment. Vacuum is drawn through the chuck and the substrate firmly adhered to the chuck and held in place during finishing. Edge polishing was conducted in the manner prescribed using a commercially available fixed abrasive grind wheel product. The edge finishing wheel of choice in this embodiment was a diamond polishing wheel shown FIG. 15A, corresponding to the microscope images of FIGS. 15B-15E and having abrasive size illustrated in FIG. 16. The physical dimensions of the exemplary wheel 100 used are as follows:

4.0 inches (101.6 mm) outside diameter
   1.25 inches (31.75 mm) inside diameter
   0.25 inch (6.35 mm) thickness The process conditions utilized for polishing with this wheel in the case of this embodiment were as follows:

Spindle speed=6000 rpm resulting in 6283 sfpm (1915 smpm) operation
   Linear part feed rate=10 inches/minute (254 mm/minute)
   Depth of cut=0.001 inch or 25.4 μm per part per cycle or 13.6 N constant force
   Coolant flow pattern=flood coolant
   Coolant flow rate ~2-10 gpm (e.g., 5 gpm)
   Coolant product=BlueKool
   Coolant concentration=3-5% in water
   Grinding platform=HURCO MX24 Machine System The desired depth of cut with the abrasive compliant wheel (also referred to as a polishing wheel herein) 100, 100", 100" was determined by polishing parts with a known edge profile and then inspecting them post polish to assess polishing effectiveness at the apex of the edge but also at the transition point between substrate surface and edge profile.

The wheel 100 was selected for the following reasons:

1. It provided a moderate pressing force of substrate into the wheel resulting in complete submersion of substrate edge (with front and back surface overlap), 2. It reduced sharp corner transition points produced by the laser cutting process used to produce the substrates. These sharp corner transition points rounded off in all critical areas during polishing with the wheel 100.
3. It has an abrasive type, size, and concentration that is sufficient to primarily reduce substrate subsurface damage in all areas of the edge, and to also produce a visually appealing substrate edge.

Figure 17:
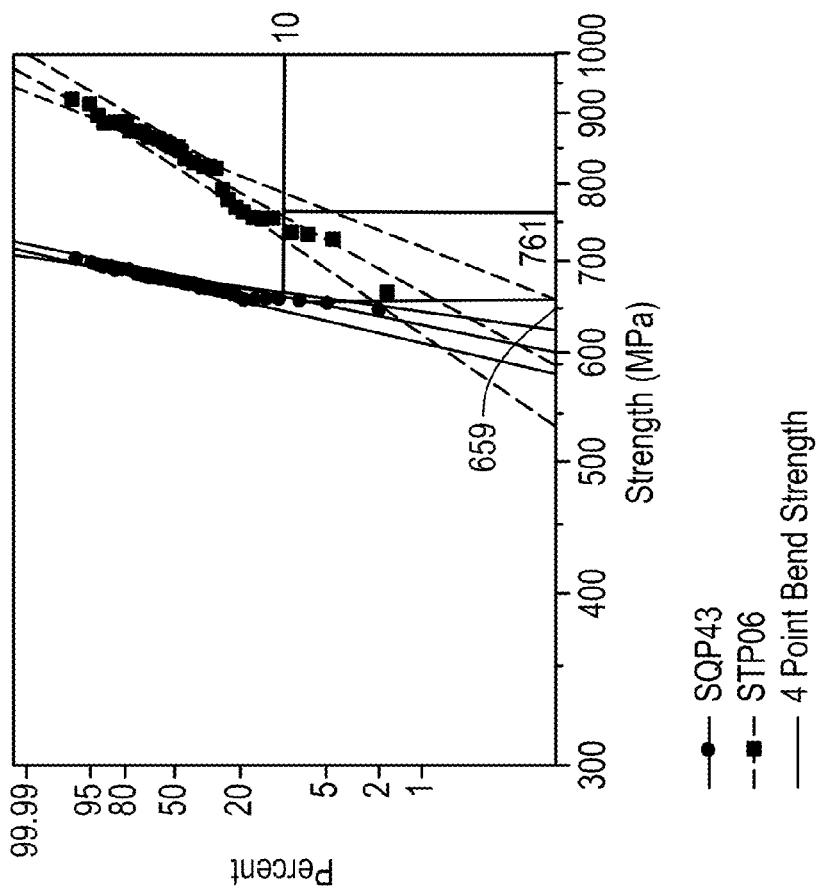
FIG. 17 illustrates exemplary edge strength (MPa) performance achieved with complient wheel polishing by the wheel 100.
Figure 18A:
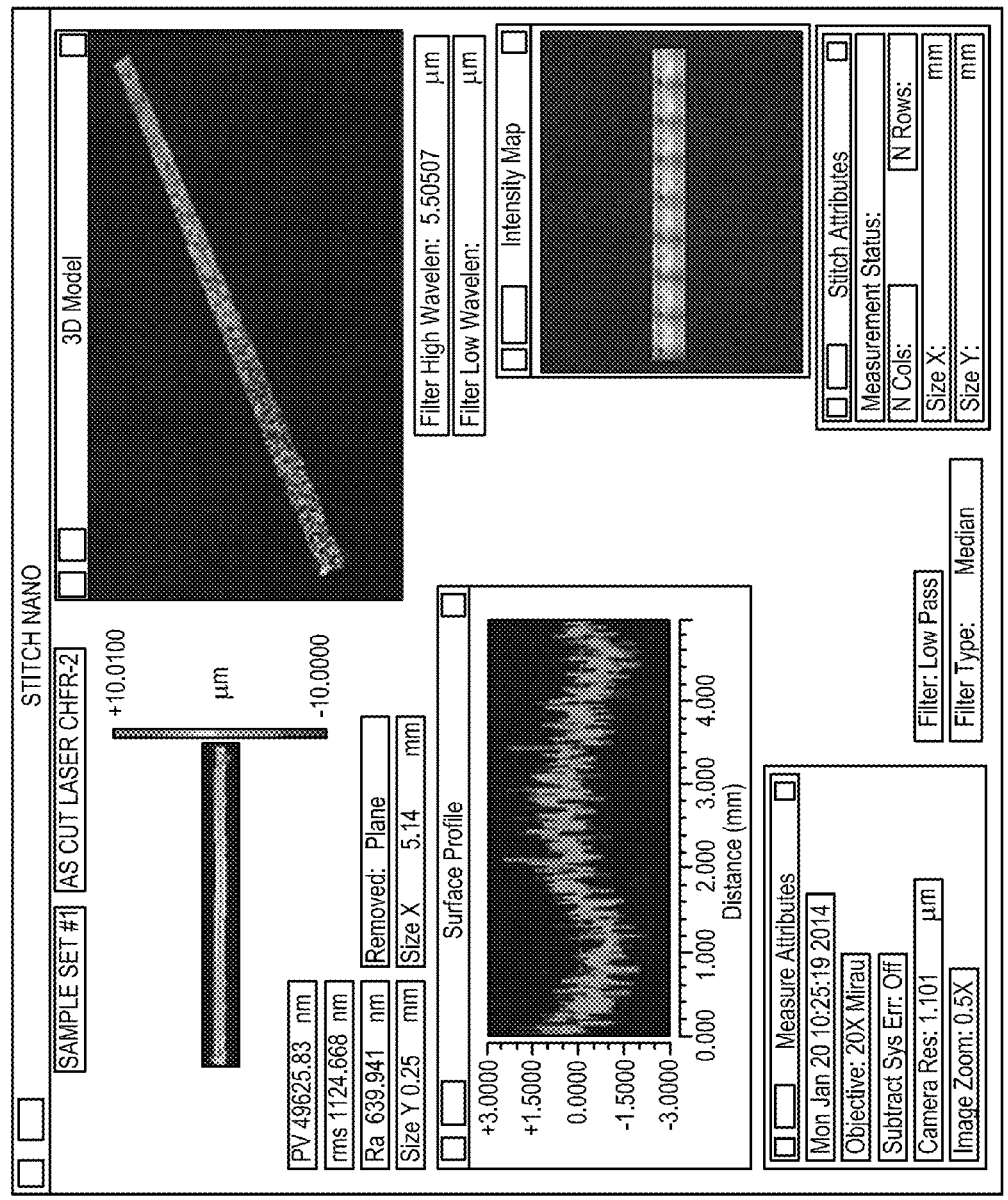
FIGS. 18A and 18B are Apex Microscope Images, respectively, of laser cut substrate edges prior and post mechanical polishing by the wheel 100 of FIG. 15A.
Figure 18B:
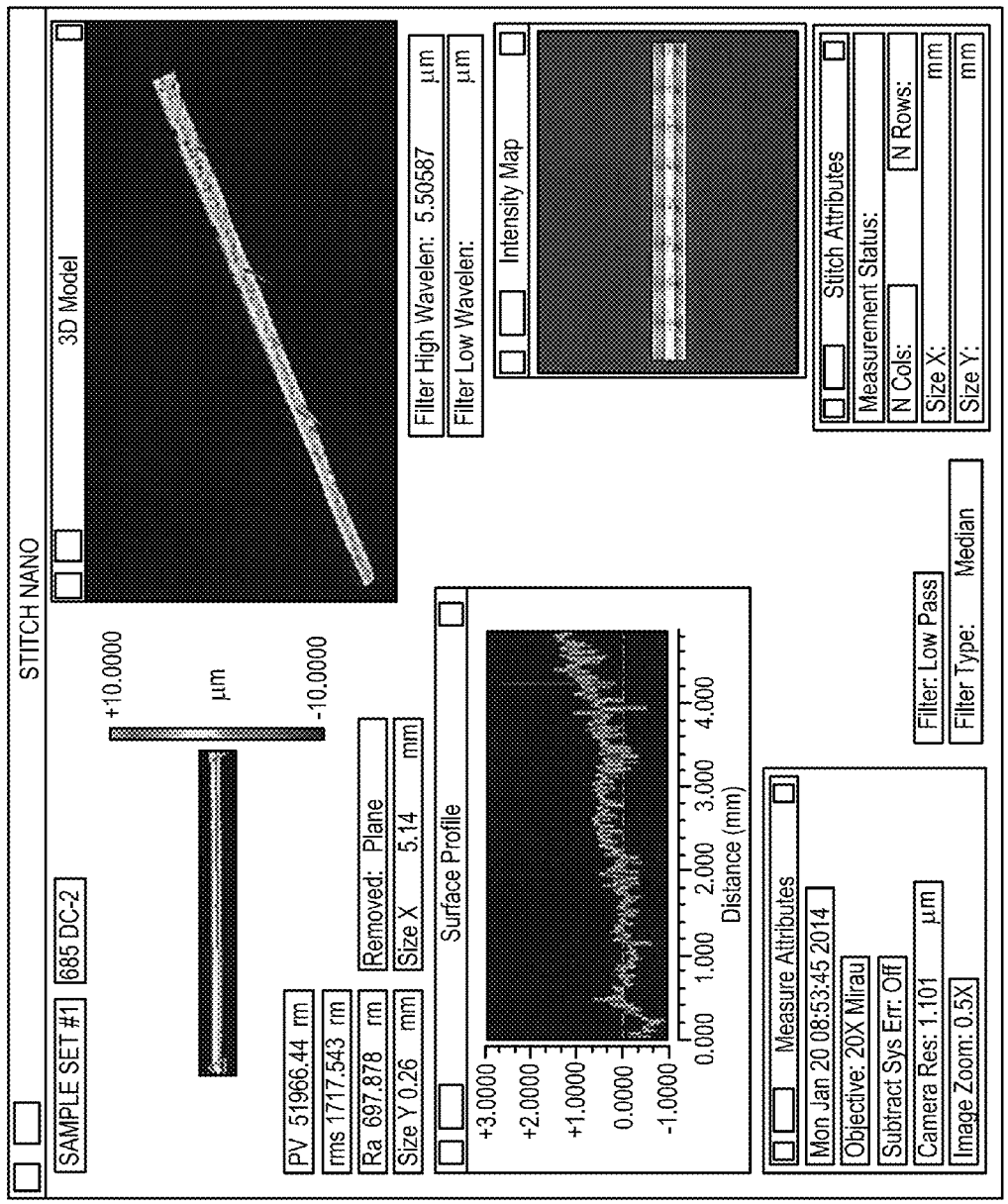
Figure 20B:
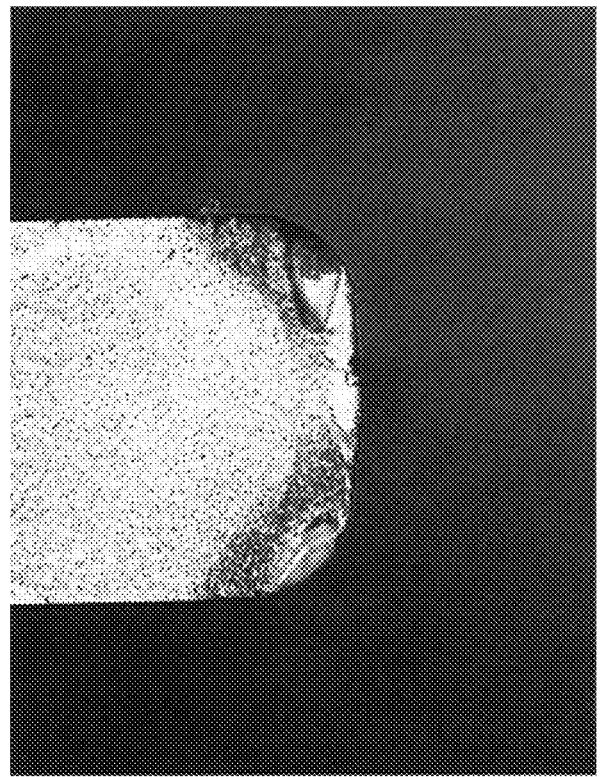
FIGS. 20A and 20B are Apex Microscope Images, respectively, of laser cut substrate corners prior and post mechanical polishing by the wheel 100, according to another embodiment.
Figure 20A:
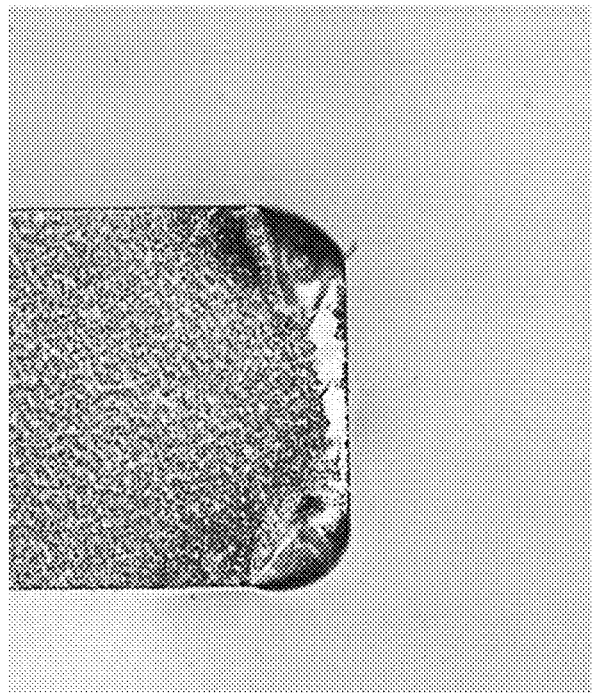

FIG. 17 illustrates exemplary edge strength performance achieved with compliant wheel polishing by the wheel 100. FIGS. 18A and 18B are Apex Microscope Images, respectively, of laser cut substrate edges prior and post mechanical polishing by the wheel 100 of FIG. 15A. FIGS. 19A and 19B are Apex Microscope Images, respectively, of laser cut substrate edges prior and post mechanical polishing by the wheel according to one embodiment. FIGS. 20A and 20B are Apex Microscope Images, respectively, of laser cut substrate corners prior and post mechanical polishing by the wheel 100, according to another embodiment. As illustrated by these figures, a visually appealing, transparent, shiny edge surface was produced, by polishing with the wheel 100 of the laser cut edges. The material removal by the wheel 100 is small—i.e., 2-10 μm, and in some embodiments about 4-8 μm. The laser cut edge profile was smoothed considerably with laser cut corners observed rounded significantly. Edge strength improvement was observed to increase over parts that were only laser cut (see FIG. 17).

The picosecond perforation portion of method 1 has been combined with the mechanical processing (polishing with wheel 100) to create the chamfer profiles. This process can be applied to transparent materials, for example thin glass (e.g., <2 m), or curved glass, and the resultant glass has strong edges and of very high quality. The stress profile created by the ion exchange releases the perforated edges The methods described above provide the following benefits that may translate to enhanced laser processing capabilities and cost savings and thus lower cost manufacturing. In the current embodiment, the cutting and chamfering processes offer:

Chamfering or fully cutting parts with chamfered edges: the disclosed method is capable of completely separating/cutting Gorilla® Glass and other types of transparent glasses in a clean and controlled fashion. Full separation and/or edge chamfering were demonstrated using both methods. With method 1, the part is cut to size or separated from glass matrix with a chamfered edge and, in principle, no further post processing. With the second method, the part is already cut to size, perforated and IOX process is used to chamfer the edges.

Reduced subsurface defects: with method 1, due to the ultra-short pulse interaction between laser and material, there is little thermal interaction and thus a minimal heat affected zone that can result in undesirable stress and microcracking. In addition, the optics that condense the laser beam into the glass creates defect lines that are typically 2 to 5 microns diameter on the surface of the part. After separation, the subsurface damage can be as low as <30 μm. This has great impact on the edge strength of the part and reduces the need to further grind and polish the edges, as these subsurface damages can grow and evolve into micro-cracks when the part is submitted to tensile stress and weaken the strength of the edge.

Process cleanliness: method 1 of the disclosure is capable of chamfering glass in a clean and controlled fashion. It is very problematic to use conventional ablative processes because they generate a lot of debris. Such ablation generated debris is problematic, because it can be hard to remove even with various cleaning and washing protocols. Any adhered particulates can cause defects for later processes where the glass is coated or metalized to create thin film transistors, etc. The characteristics of the laser pulses and the induced interactions with the material of the disclosed method avoid this issue because they occur in a very short time scale and the material transparency to the laser radiation minimizes the induced thermal effects. Since the defect line is created within the object, the presence of debris and adhered particles during the cutting step is virtually eliminated. If there are any particulates resulting from the created defect line, they are well contained until the part is separated.

Elimination of Process Steps

The process to fabricate glass plates or substrates from the incoming glass panel to the final size and shape involves several steps that encompass cutting the panel, cutting to size, finishing and edge shaping, thinning the parts down to their target thickness, polishing, and even chemically strengthening in some cases. Elimination of any of these steps will improve manufacturing cost in terms of process time and capital expense. The presented method may reduce the number of steps by, for example:

1. Reduced debris and edge defects generation—potential elimination of washing and drying stations
2. Cutting the sample directly to its final size with shaped edges, shape and thickness—reducing or eliminating need for mechanical finishing lines (for example The method by finishing the cut part is a single polishing step without additional grinding or polishing, and a huge non-value added cost associated with them.

Thus, according to some embodiments a method of processing a workpiece comprises the steps of:
(i) focusing a pulsed laser beam into a laser beam focal line, viewed along the beam propagation direction;
(ii) directing the laser beam focal line into the workpiece at a first angle of incidence to the workpiece, the first angle intersecting an edge of the workpiece, the laser beam focal line generating an induced absorption within the workpiece, the induced absorption producing a defect line along the laser beam focal line within the workpiece;
(ii) translating the workpiece and the laser beam relative to each other, thereby laser drilling a plurality of defect lines along a first plane at the first angle within the workpiece, each of said defect lines having a diameter of not greater than 5 μm; and
(iv) separating the workpiece along the plane to create a laser cut workpiece with at least one cut surface; and
(v) polishing (i.e., edge finishing) the cut surface of the laser cut workpiece with a polishing wheel a bulk modulus of elasticity of 0.1 GPa to 5 GPa.

According to some embodiments the laser cut surface workpiece is polished very quickly, i.e., the total edge finishing step of the cut surface,—i.e., the total polishing time polishing time t is: 1 sec<t<1 min. According to some embodiments t≤30 sec, and in some embodiments all of the exterior edges of the workpiece cut by the laser were finished in ≤10 sec (i.e., the laser cut edges were polished in 10 seconds or less). No mechanical glass grinding step by a grinding wheel was required—i.e., the laser cut surface(s) of the workpiece was polished in one polishing step after separation or laser cutting, without mechanical grinding and without the need for use of multiple grinding/polishing steps. Preferably the polishing wheel 100, 100', or 100" has an outer diameter of 40 mm to 250 mm, in some embodiments the polishing wheel has an outer diameter of 50 mm to 200 mm and in some embodiments the outer diameter of the polishing wheel is 80 mm to 120 mm. The diameter of the wheel determines the contact area between the substrate edge and the polishing wheel 100, 100', 100". A large diameter wheel provides a larger contact area (and slower revolutions per min) and is more preferable for thicker glass pieces, a smaller diameter wheel provides a smaller contact area (and larger number of revolutions per min) and is preferable for smaller or thinner glass workpieces. Preferably the polishing wheel 100, 100', or 100" rotated at 500 rpm to 10000 rpm. Faster wheel speed increase the overall contact of the wheel with the workpiece. Larger rotational speeds are preferred because they increase the number of contacts between the abrasive particles and the workpiece edge. According to some embodiments the polishing wheel 100, 100', or 100" rotated at 500 rpm to 8000 rpm, for example at 5000 to 7000 rpm. According to some embodiments described herein, the polishing wheel 100, 100', or 100" comprises of multiple abrasive particles, typically having a cross-sectional width of 0.1 µm to 100 µm, and the abrasive particles have relative toughness (fracture toughness) of 600 MPG to 680 MPG (e.g., 620-670 MPG or 650 MPG to 670 MPG). The resultant glass substrate may have, for example, an edge strength between 600 MPa and 1000 MPa. According to some embodiments the polishing wheel 100, 100', or 100" has an outer diameter of 80 mm to 120 mm, the polishing wheel is rotated at 500 rpm to 8000 rpm, the polishing wheel comprises of multiple abrasive particles, the abrasive particles having a cross-sectional width of 0.1 µm to 100 µm and relative toughness of 650 MPG to 670 MPG and abrasive friability of MBG 650-MBG 680. It is noted that according to at least some embodiments the non strengthened glass was first laser cut as described above to create at least one chamfered edge, edge polished with a wheel 100, 100', or 100" as described according to the embodiments disclosed herein, and then ion exchanged or chemically strengthened to provide a glass workpiece with edge strength of 600 MPa and 1000 MPa, post ion exchange (post IOX edge strength). Thus, according to some embodiments the glass contains high levels of alkali (e.g., >5 wt %>, or ≥7 wt %, for example 7-12 wt %) and can be ion exchanged. Embodiments of such glasses, for example have CTE of ~7-9 ppm/° C. and high amounts of alkalis like sodium in composition (allowing it to be ion exchanged) as well as relatively high thermal diffusivity.

One exemplary embodiment processed by the method described herein is Corning Gorilla® glass workpiece.

According to other embodiments the glass is alkaline earth boro-aluminosilicate glass composite (with low or no alkali).

The relevant teachings of all patents, published applications and references cited herein are incorporated by reference in their entirety.

While exemplary embodiments have been described herein, it will be understood by those skilled in the art that various changes in form and details may be made therein without departing from the scope of the invention encompassed by the appended claims.

What is claimed is:

1. A method of chamfering or beveling an edge of a workpiece comprising a glass substrate, the method comprising the steps of:
    (i) focusing a pulsed laser beam into a laser beam focal line, viewed along a beam propagation direction;
    (ii) directing the laser beam focal line into the workpiece at a first angle of incidence to the workpiece, the first angle intersecting an edge of the workpiece, the laser beam focal line generating an induced absorption within the workpiece, the induced absorption producing a defect line along the laser beam focal line within the workpiece;
    (iii) translating the workpiece and the laser beam relative to each other, thereby forming a plurality of defect lines along a first plane at the first angle within the workpiece, each of said defect lines having a diameter of not greater than 5 µm; and
    (iv) separating the workpiece along the plane to create a laser cut workpiece with at least one laser cut surface; and
    (v) processing the workpiece by polishing the laser cut surface of the laser cut workpiece with a polishing wheel, wherein the polishing wheel has a bulk modulus of elasticity of 0.1 GPa to 5 GPa, said abrasive particles having relative toughness of at least 600 MBG.

2. A method according to claim 1, further comprising:
    directing the laser beam focal line into the workpiece at a second angle of incidence to the workpiece, the laser beam focal line generating an induced absorption within the workpiece, the induced absorption producing a defect line along the laser beam focal line within the workpiece;
    translating the workpiece and the laser beam relative to each other, thereby forming a second plurality of defect lines along a second plane at the second angle within the workpiece, the second plane intersecting the first plane, each of said second plurality of defect lines having a diameter of not greater than 5 µm, and
    wherein said separating is performed by separating the material along the first plane and the second plane, producing said laser cut workpiece.

3. A method of chamfering or beveling an edge of a workpiece according to claim 1 by laser processing a glass material, the method comprising:
    inducing a plurality of defect lines along each of N planes within the material by, for each of the N planes by:
    directing the laser beam focal line into the material at a corresponding angle of incidence to the material, the laser beam focal line generating an induced absorption within the material, the induced absorption producing a defect line along the laser beam focal line within the material; and
    translating the material and the laser beam relative to each other, thereby laser forming the plurality of defect lines along the corresponding plane of the N planes, each of said plurality of defect lines having a diameter of not greater than 5 µm; and
    separating the workpiece along at least one of said N planes by applying an ion-exchange process to the workpiece to create a laser cut workpiece with the laser cut surface; and
    wherein said step of polishing said laser cut surface of said laser cut workpiece by said polishing wheel having a bulk modulus of elasticity of 0.1 GPa to 5 GPa for a time t, where 1 sec<t<1 min, wherein the polishing wheel comprises abrasive particles.

4. The method of claim 1, wherein said polishing wheel has an outer diameter of 40 mm to 250 mm.

5. The method of claim 4, wherein said polishing wheel has an outer diameter of 50 mm to 200 mm.

6. The method of claim 5, wherein said polishing wheel has an outer diameter of 80 mm to 120 mm.

7. The method according to claim 1, wherein the polishing wheel is rotated at 500 rpm to 10000 rpm.

8. The method according to claim 7, wherein the polishing wheel is rotated at 500 rpm to 8000 rpm.

9. The method according to claim 1, wherein the polishing wheel comprises of multiple abrasive particles, said abrasive particles having a cross-sectional width of 0.1 μm to 100 μm.

10. The method according to claim 1, wherein the polishing wheel comprises multiple abrasive particles, said abrasive particles having relative toughness of 600 MBG to 680 MBG.

11. The method according to claim 1, wherein said laser beam is produced by a burst pulse laser with the pulse duration in a range of between greater than about 5 picoseconds and less than about 20 picoseconds, the burst repetition rate in a range of between about 1 kHz and 2 MHz.

12. The method according to claim 11, wherein the burst repetition rate is in a range of between about 10 kHz and 650 kHz.

13. The method according to claim 11, wherein said burst pulse laser produces burst pulses that include 2-25 pulses per burst.

14. The method according to claim 1, wherein said laser has power 8 Watts or higher.

15. The method according to claim 1, wherein said laser has 10-100 Watts of power.

16. The method according to claim 1, wherein said laser has power that is between 40 microJoules per mm thickness of workpiece material and 1000 microJoules per mm thickness of workpiece material.

17. The method according to claim 1, wherein said laser beam focal line has an average spot diameter in a range of between about 0.1 μm and about 5 μm and length between 0.5 mm and 1.5 mm.

* * * * *

UNITED STATES PATENT AND TRADEMARK OFFICE
CERTIFICATE OF CORRECTION

PATENT NO. : 10,173,916 B2
APPLICATION NO. : 15/114243
DATED : January 8, 2019
INVENTOR(S) : Jonas Bankaitis et al.

It is certified that error appears in the above-identified patent and that said Letters Patent is hereby corrected as shown below:

References Cited

On page 6, Column 1, item (56), other publications, Line 8, delete "(ooverseas" and insert -- (overseas --, therefor.

On page 6, Column 2, item (56), other publications, Line 7, delete "Culling" and insert -- Cutting --, therefor.

On page 7, Column 1, item (56), other publications, Lines 5-6, delete "Eelectropolishing;" and insert -- Electropolishing; --, therefor.

Signed and Sealed this
Tenth Day of September, 2019

Andrei Iancu
*Director of the United States Patent and Trademark Office*